United States Patent [19]

Reddig et al.

[11] Patent Number: 5,653,773
[45] Date of Patent: Aug. 5, 1997

[54] PROCESS FOR DYEING OR PRINTING FIBRE MATERIALS CONTAINING HYDROXYL GROUPS

[75] Inventors: Wolfram Reddig, Leverkusen; Joachim Wolff, Odenthal; Ulrich Hanxleden, Leverkusen, all of Germany

[73] Assignee: Bayer Aktiengesellschaft, Leverkusen, Germany

[21] Appl. No.: 430,626

[22] Filed: Apr. 28, 1995

[30] Foreign Application Priority Data

May 5, 1994 [DE] Germany .................. 44 15 779.7

[51] Int. Cl.$^6$ .............. D06P 3/58; D06P 1/673; D06P 3/87; C09B 67/22
[52] U.S. Cl. .............. 8/532; 8/638; 8/641; 8/687; 8/688
[58] Field of Search .............. 8/532, 638–641, 8/917–925, 687–88

[56] References Cited

U.S. PATENT DOCUMENTS

| | | |
|---|---|---|
| 4,990,615 | 2/1991 | Henk et al. . |
| 5,122,605 | 6/1992 | Pedrazzi . |
| 5,213,582 | 5/1993 | Wild et al. .................. 8/506 |
| 5,223,000 | 6/1993 | Lauk ............................ 8/638 |
| 5,232,462 | 8/1993 | Tzikas . |
| 5,268,475 | 12/1993 | Lauk . |
| 5,320,648 | 6/1994 | McMullan et al. . |
| 5,324,330 | 6/1994 | Schaulin et al. . |

FOREIGN PATENT DOCUMENTS

| | | |
|---|---|---|
| 0549530 | 6/1993 | European Pat. Off. . |
| 3936183 | 5/1991 | Germany . |
| 3939700 | 6/1991 | Germany . |

*Primary Examiner*—Margaret Einsmann
*Attorney, Agent, or Firm*—Sprung Horn Kramer & Woods

[57] ABSTRACT

Process for dyeing or printing fibre materials containing hydroxyl groups, characterized in that at least one blue-dyeing dyestuff of the formula

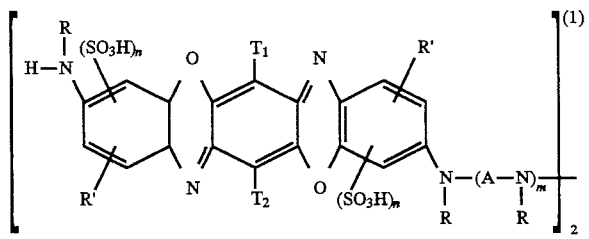

wherein the substituents have the meaning given in the description, is used together with at least one yellow-dyeing and/or at least one red-dyeing and/or at least one navy blue- or black-dyeing dyestuff.

14 Claims, No Drawings

PROCESS FOR DYEING OR PRINTING FIBRE MATERIALS CONTAINING HYDROXYL GROUPS

The present invention relates to a process for dyeing or printing fibre materials containing hydroxyl groups with dyestuff mixtures in accordance with the dichromaticity principle.

For dyeing or printing textile fibre materials in accordance with the dichromaticity principle, dyestuffs having a colour build-up which is as uniform as possible coupled with a constancy of nuance in various concentrations and a good ability to be combined are required, inter alia, in order to obtain dyed/printed textile fibre materials which largely meet the requirements. Mixtures of a yellow- or orange-dyeing dyestuff together with a blue- and/or red-dyeing dyestuff are known from EP-A-549 529 (=U.S. Pat. No. 5,320,648).

This aim was not always to be achieved with the dyestuffs/dyestuff mixtures used to date, in particular in respect of ability to be combined, rate of absorption, degree of absorption, especially in deep, clear shades, fibre and surface levelness and general fastness properties, such as, for example, wet-fastness properties, and the object of the present invention was therefore to provide improved processes for dyeing or printing fibre materials containing hydroxyl groups, in particular in accordance with the dichromaticity principle.

Mixtures are further known from EP-A-478,503 (=U.S. Pat. No. 5,232,462), EP-A-548,014 (=U.S. Pat. No. 5,324,330) and EP-A-549,530.

The present invention relates to a process for dyeing or printing fibre materials containing hydroxyl groups, which is characterized in that at least one blue-dyeing dyestuff of the formula $$\left[ H-N(R) \cdots (SO_3H)_n \cdots O-T_1 \cdots N=... R' \cdots N-(A-N)_m \cdots \right]_2 -W-$$ (1)

is used together with at least one yellow-dyeing and/or at least one red-dyeing and/or at let one navy blue- or black-dyeing dyestuff, wherein R=hydrogen or optionally substituted alkyl, in particular $C_1$–$C_4$-alkyl, R'=hydrogen or a substituent, $T_1$ and $T_2$=hydrogen, chlorine, bromine, optionally substituted $C_1$–$C_4$-alkyl, $C_1$–$C_4$-alkoxy, phenyl or W=a bridge member, A=an optionally substituted alkylene, cycloalkylene, arylene or aralkylene radical and m and n=0 or 1, wherein the substituents and indices with the same designation can have different meanings.

If n=1, the sulpho group is in the o-position relative to the substituent —NR—.

Furthermore, the invention refers to dyestuff mixtures comprising at least one blue-dyeing dyestuff of the formula (I) and at least one yellow-dyeing and/or at least one red-dyeing and/or at least one navy blue- or black-dyeing dyestuff as defined supra.

The bridge members W can be the bridge members customary in dyestuffs, which are known, for example, from EP-A-361 186 (=U.S. Pat. No. 4,990,615), DE-A-4 005 551 (=U.S. Pat. No. 5,122,605), DE-A-3 936 183, DE-A-3 939 700 and EP-A-485 329 (=U.S. Pat. No. 5,268,475).

Particularly preferred such bridge members are:

a) triazine ring bridge with X substituent wherein X=H or a substituent customary in dyestuffs bridged by triazine b) —CO—(p-phenylene)—CO— c) —CO—(o-phenylene)—CO—

Examples of R are: $CH_3$, $C_2H_5$, n-$C_3H_7$, n-$C_4H_9$ and n-$C_6H_{13}$, which can be substituted, for example, by OH, $OCH_3$, $OC_2H_5$, COOH, $SO_3H$, $OSO_3HCN$, or Cl.

Substituents of optionally substituted $C_1$–$C_4$-alkyl and $C_1$–$C_4$-alkoxy radicals $T_1$ and $T_2$ are, for example, $C_1$–$C_4$-alkoxy or $OSO_3H$.

Substituents of optionally substituted phenyl and phenoxy radicals $T_1$ and $T_2$ are, for example, Cl, Br, $C_1$–$C_4$-alkyl, $C_1$–$C_4$-alkoxy and $SO_3H$.

Suitable substituents R' are, for example, the following: halogen, such as Cl, $C_1$–$C_4$-alkyl, $C_1$–$C_4$-alkoxy and COOH.

Examples of substituents X are: halogen atoms, such as fluorine, chlorine or bromine; the sulphonic acid group, lower alkyl, such as methyl, ethyl, n-propyl, i-propyl, n-butyl or t-butyl, a thioether group, for example one of the general formula —S—$R_1$, or an ether group, for example one of the general formula —O—$R_2$, in which $R_1$ denotes a substituent free the group consisting of alkyl and substituted alkyl, such as, for example, phenyl which is substituted by substituents from the group consisting of hydroxyl, lower alkoxy, sulphato, sulpho, carboxyl and phenyl, such as, for example, phenyl which is substituted by substituents from the group consisting of nitro, sulpho and carboxyl, and $R_2$ is a hydrogen atom or has the abovementioned meaning of $R_1$, or is an optionally substituted amino group, for example one of the general formula —$NR_3R_4$, in which $R_3$ is a hydrogen atom, an aliphatic radical, an araliphatic radical or a cycloaliphatic radical, such as, for example, a lower alkyl radical, which can be substituted by one or two substituents from the group consisting of hydroxyl, sulphato, lower alkoxy, sulpho, carboxyl and phenyl, or a cyclohexyl radical, and $R_4$ represents a hydrogen atom, an aliphatic radical, for example a lower alkyl radical, which can be substituted by hydroxyl, lower alkoxy, sulphato, sulpho and carboxyl, or represents an optionally substituted aromatic radical, such as, for example, a phenyl or naphthyl radical, which can be substituted by one or two substituents from the group consisting of hydroxyl, carboxyl, sulpho, lower- alkyl and lower alkoxy, or represents an optionally substituted araliphatic radical, such as, for example, a lower alkyl radical, which is substituted by phenyl or naphthyl, or represents a hydroxyl or a lower alkoxy group, or represents an optionally substituted amino group, such as, for example, the amino group or a phenylamino or lower alkylamino group, or in which $R_3$ and $R_4$ together with the nitrogen atom form a heterocyclic ring with an alkylene radical of 2 to 8, preferably 5 to 7 C atoms, or a heterocyclic ring which contains two or three lower alkylene radicals and 1 or 2 hereto atoms, such as, for example, a nitrogen atom or oxygen atom, such as, for example, the morpholine, piperidine or piperazine ring.

An optionally substituted alkylene radical A is, for example, an optionally substituted $C_2$–$C_6$-alkylene radical, and preferably a $C_2$–$C_6$-alkylene radical which is unsubstituted or substituted, for example, by hydroxyl, sulpho, sulphato, $C_1$–$C_4$-alkoxy, carboxyl, cyano, halogen, phenyl, sulphophenyl or $C_2$–$C_5$-alkoxycarbonyl and/or optionally interrupted by 1 to 2 groups —O—, —N(R")—, where R" denotes $C_1$–$C_4$-alkyl, acetyl or, in particular, hydrogen, —S—, —$SO_2$— or a cycloaliphatic or heterocyclic-aliphatic radical.

Examples of suitable alkyl e radicals A are 1,2-ethylene, 1,2- and 1,3-propylene, 1-ethyl-1,2-ethylene, 2-hydroxy-1,3-propylene, 2-sulphato-1,3-propylene, 1-and 2-phenyl-1,3-propylene, 2-(4'-sulphophenyl)-1,3-propylene, 1,4-, 2,3- and 2,4-butylene, 1,2-dimethyl-1,2-ethylene, 1-phenyl-1,2-ethylene, 2-methyl-1,3-propylene, 2,2-8methyl-1,3-propylene, 1-chloro-2,3-propylene, 1,5- and 2,4-pentylene, 2-methyl-2,4-pentylene, 1-carboxy-1,5-pentylene, 2,3-diphenyl-1,4-butylene, 1-methoxy-carbonyl-1,5-pentylene, 1,6-and 2,5-hexylene, 2-carboxy-1,3-propylene, 2-methoxy-1,3-propylene, a radical of the formula —$CH_2$—$CH_2$—Z'—$CH_2$—$CH_2$—, wherein Z' denotes —O—, —S—, —$SO_2$—, —NH— or —N($CH_3$)—, or a radical of the formula

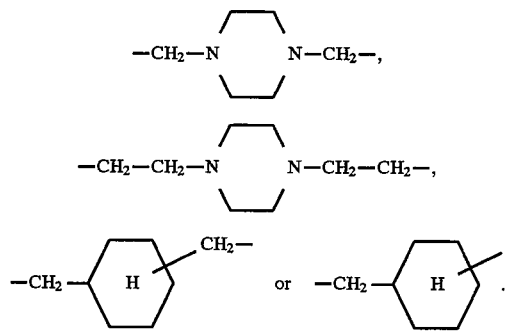

An alkylene radical A is particularly preferably a $C_2$–$C_4$-alkylene radical which is unsubstituted or substituted by hydroxyl, sulpho, sulphato, methoxy, carboxyl or sulphophenyl, and especially preferably a 1,2-ethylene or 1,2- or 1,3-propylene radical which is unsubstituted or substituted by hydroxyl or sulphato. In a particularly preferred embodiment of the invention, A represents 1,2-ethylene, 1,2- or 1,3-propylene or 2-sulphato-1,3-propylene.

Optionally substituted cycloalkylene A is, for example, optionally substituted $C_5$–$C_9$-cycloalkylene, and preferably cyclopentylene or cyclohexylene which is unsubstituted or mono- or polysubstituted by $C_1$–$C_3$-alkyl; A here is particularly preferably cyclohexylene which is unsubstituted or substituted by 1 to 4 methyl groups.

Examples of suitable cycloaliphatic radicals A are: 1,3- and 1,4-cyclohexylene, 4-methyl-1,3-cyclohexylene, 2-methyl-1,3-cyclohexylene, 5,5-dimethyl-1,3-cyclohexylene, 2-methyl-1,4-cyclohexylene, 4,6-dimethyl-1,3-cyclohexylene, and 4-methyl-1,2-cyclohexylene.

If A represents a bivalent aryl radical, this can be, for example, a phenylene, biphenylene or naphthylene radical which is unsubstituted or substituted, for example, by $C_1$–$C_4$-alkyl, $C_1$–$C_4$-alkoxy, sulpho, halogen or carboxyl.

Examples of arylene radicals A are: 1,3- and 1,4-phenylene, 2-sulpho-1,4-phenylene, 2,5-disulpho-1,4-phenylene, 4-sulpho-1,3-phenylene, 2-methyl-1,4-phenylene, 2-carboxy-1,4-phenylene, 2-methoxy-1,4-phenylene, 4,8-disulpho-2,6-naphthylene, 8-sulpho-2,6-naphthylene, 1,4-naphthylene and 1,1'-biphenyl-4,4'-diyl.

An arylene radical A preferably represents a 1,3- or 1,4-phenylene radical which is unsubstituted or substituted by sulpho, methyl, methoxy or carboxyl, or represents a naphthylene radical which is unsubstituted or substituted by sulpho.

An arylene radical A is particularly preferably 1,3- or 1,4-phenylene which is unsubstituted or substituted by sulpho.

If A denotes an optionally substituted aralkylene radical, it can be, for example, a $C_1$–$C_6$-alkylene-phenylene, a phenylene-$C_1$–$C_6$-alkylene-phenylene, a $C_1$–$C_3$-alkylenephenylene-$C_1$–$C_3$-alkylene or a methylene-naphthylenemethylene radical, it being possible for the alkylene in these aralkylene radicals to be optionally substituted as described above and/or interrupted by one of the abovementioned hetero groups and for the phenylene and naphthylene optionally also to carry 1 or 2 substituents chosen from the group consisting of sulpho, carboxyl, sulphamoyl, carbamoyl, methyl, ethyl, methoxy, ethoxy, nitro, chloro, amino, N-methyl and N-ethylamino, N,N'-dimethyl and N,N'-diethylamino and phenylamino.

Examples of suitable aralkylene radicals A are:

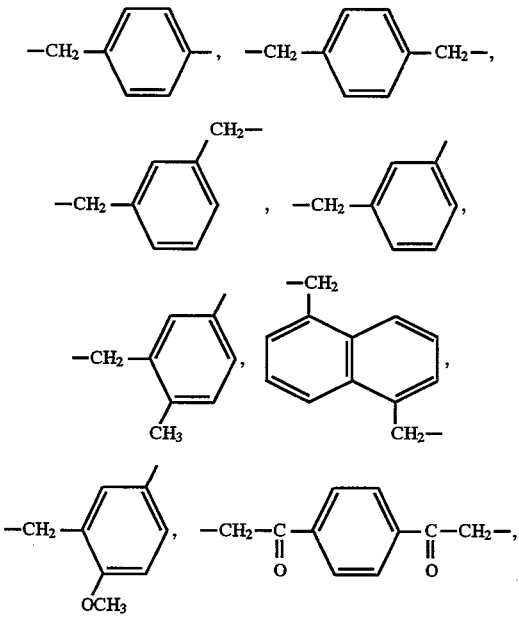

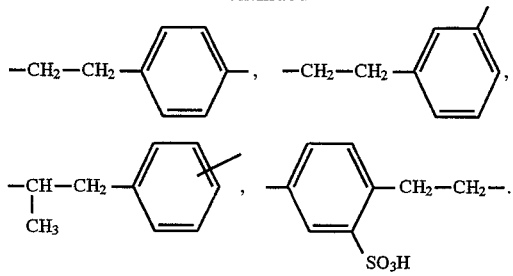

An aralkylene radical A is preferably a $C_1$–$C_3$-alkylenephenylene or $C_1$–$C_2$-alkylene-phenylene-$C_1$–$C_2$-alkylene radical, which is unsubstituted or substituted, for example, by methyl, methoxy, chlorine or sulpho in the phenyl part.

A preferably denotes a $C_2$–$C_4$-alkylene radical which is unsubstituted or substituted by hydroxyl, sulpho, sulphato, methoxy, carboxyl or sulphophenyl, —$CH_2$—$CH_2$—Z'—$CH_2$—$CH_2$—, wherein Z' denotes —O—, —S—, —$SO_2$—, —NH— or —N($CH_3$)—, a cyclohexylene radical which is unsubstituted or substituted by 1 to 4 methyl groups, a 1,3- or 1,4-phenylene radical which is unsubstituted or substituted by sulpho, or a $C_1$–$C_3$-alkylenephenylene or $C_1$–$C_2$-alkylene-phenylene-$C_1$–$C_2$-alkylene radical, wherein the phenylene is in each case unsubstituted or substituted by methyl, methoxy, chlorine or sulpho.

Compounds in which m is 1 are described, for example, in EP-A-485 329.

The above formula radical $R_1$, but preferably not the formula radical $R_2$, can also denote the benzothiazol-2-yl radical.

Aliphatic radicals are quite generally, for example, optionally substituted alkyl radicals having 1 to 10 C atoms, which can optionally be interrupted by hetero atoms or hereto atom group s, for example by O, N, S, CONH, $SO_2NH$ or $SO_2$.

Lower alkyl or alkoxy radicals are those having 1 to 4 C atoms.

Preferred dyestuffs in the context of the formula (1) correspond to the formula

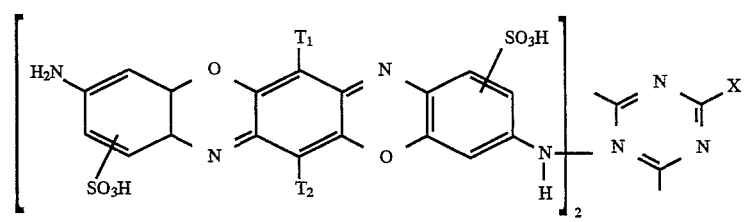

wherein $T_1$, $T_2$ and X have the meaning given. Dyestuffs of the formulae (1) or (2) which are furthermore preferred are those which $T_1$ and $T_2$=Cl or $OCH_3$.

X preferably represents a chlorine atom or a sulpho group, or a radical of the formula —S—$R_1$ or —O—$R_2$, in which $R_1$ preferably denotes a phenyl radical, which can be substituted by chlorine or nitro, or a lower alkyl radical, which can be substituted by hydroxyl or carboxyl, and $R_2$ is preferably a hydrogen atom or a lower alkyl radical or a phenyl radical, which can be substituted by sulpho or carboxyl. The formula radical X furthermore preferably denotes an amino group of the formula —$NR_3R_4$, in which $R_3$ preferably denotes a hydrogen atom or a lower alkyl group, which can be substituted by a carboxyl or sulpho group, and in which $R_4$ preferably denotes a hydrogen atom or a lower alkyl group, which can be substituted by a hydroxyl, sulphato, carboxyl, sulpho or lower alkoxy group, a phenyl radical or a cyclohexyl radical.

Amine radicals —$NR_3R_4$ which are furthermore preferred are those in which $R_3$ and $R_4$ form a ring, optionally including a further hereto atom.

Examples of preferred radicals X are:

Cl, $OCH_3$, $OC_2H_5$, $OCH_2CH_2OCH_3$, $SO_3H$, $SCH_2COOH$, $SCH_2CH_2OH$, $NH_2$, $NHCH_3$, $N(CH_3)_2$, $N(C_2H_5)_2$, $NHC_2H_5$, $NHCH_2CH_2OH$, $NHCH_2CH_2OCH_3$, $N(C_2H_4OH)_2$, $NCH_2CH_2OH$ (|$CH_3$), $NCH_2CH_2SO_3H$ (|$CH_3$), $NHCH_2CH_2CH_3$, $NCH_2CH_2CH_3$ (|$CH_3$), $NCH_2CH_2OSO_3H$ (|$CH_3$), $NCH_2SO_3H$ (|$CH_3$), $NHCH_2CH_2OSO_3H$, $NHCH_2CH_2SO_3H$, $NHCH(CH_3)_2$, $NHCH_2CHOSO_3H$ (|$CH_3$), $NHCH_2COOH$, $NCH_2COOH$ (|$CH_3$), $NHCH_2CH_2COOH$,

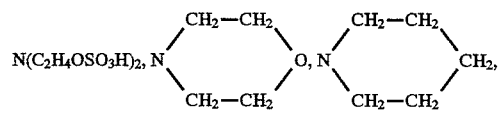

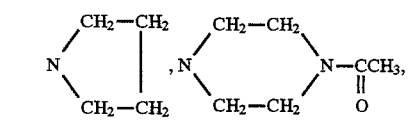

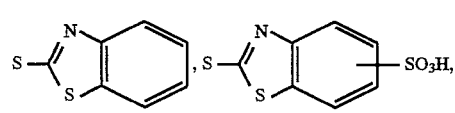

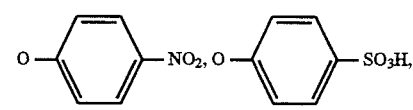

-continued

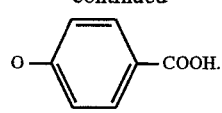

Dyestuffs of the formula (2) which are of particular interest or the process according to the invention are the dyestuffs of the formulae

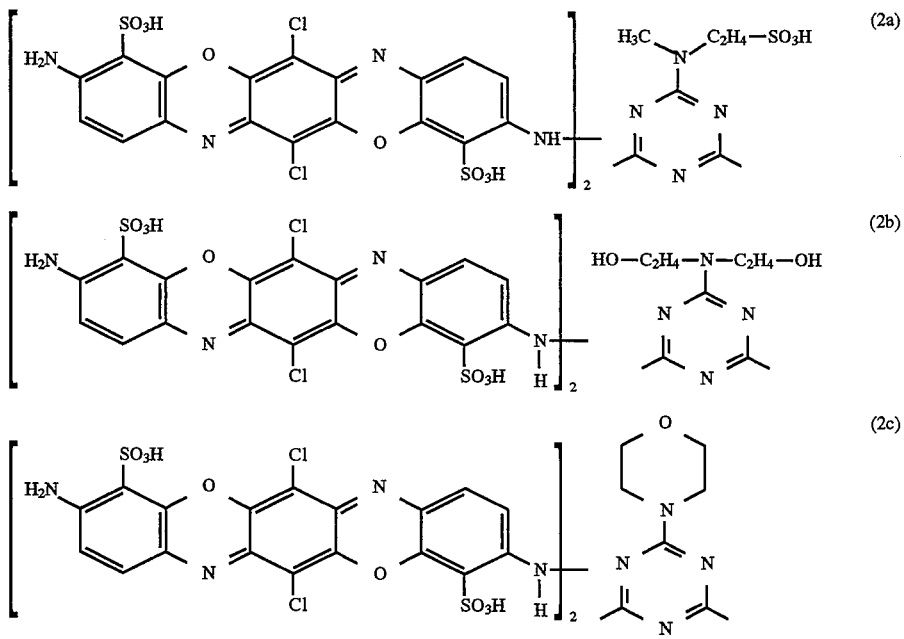
especially the dyestuff of the formula (2a).
Other particularly preferred dye stuffs of the formula (I) are:
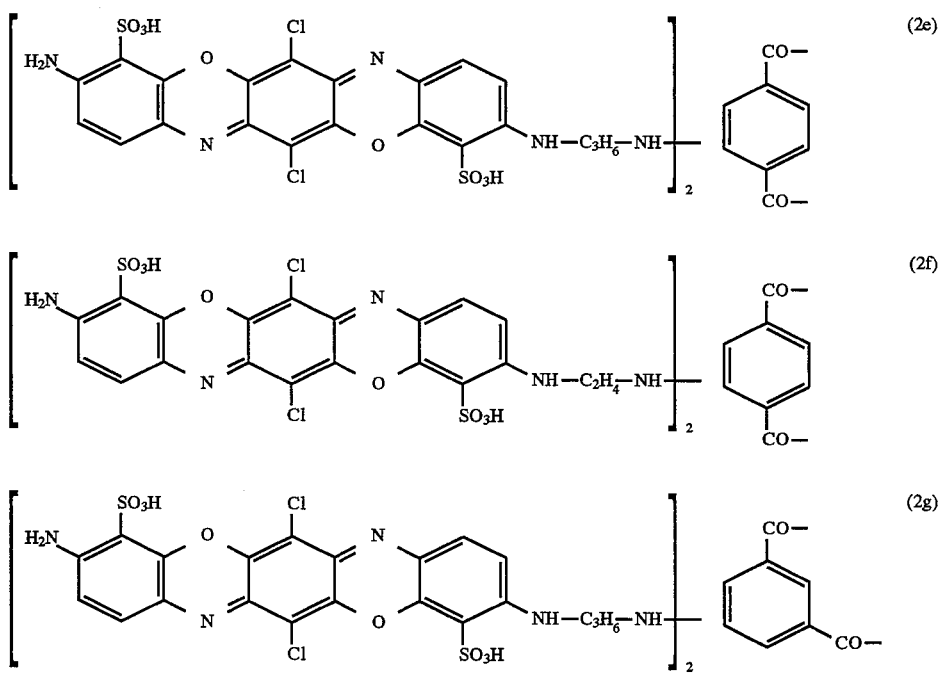

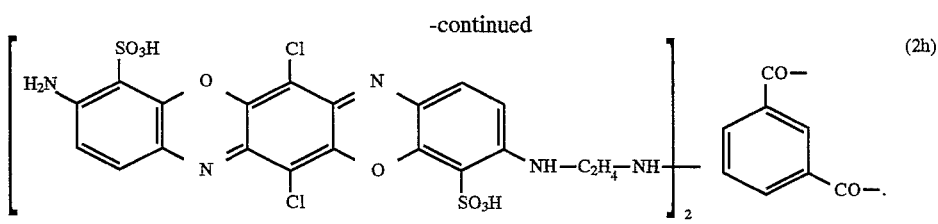

(2h)

Yellow-dyeing dyestuffs which are used in the processes according to the invention are preferably at least one dyestuff of the formulae (3) and (4)

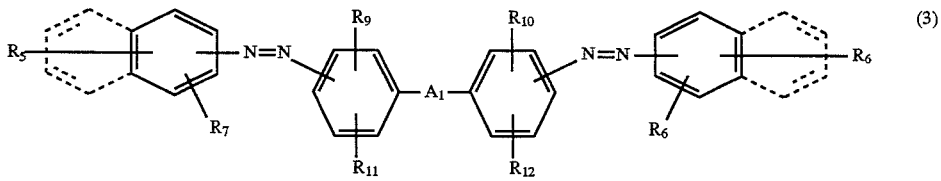

(3)

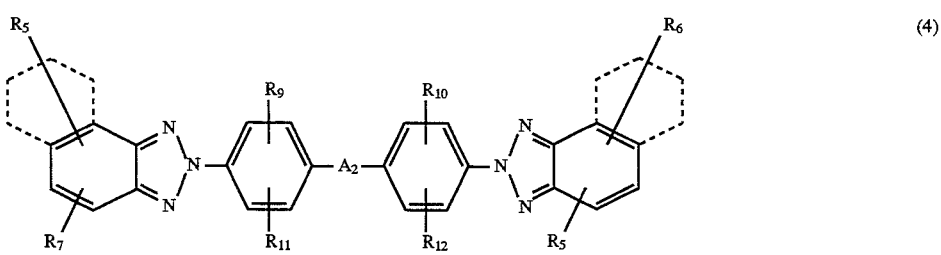

(4)

wherein

- $R_5$ and $R_6$ denote hydrogen, $C_1-C_8$-alkyl, $C_1-C_8$-alkoxy, halogen, carboxyl, sulpho, ureido, $C_2-C_6$-alkanoyl amino which is optionally substituted in the alkyl part, or optionally substituted arylazo,

- $R_7$, $R_8$, $R_9 R_{10}$, $R_{11}$, and $R_{12}$ denote hydrogen, $C_1-C_8$-alkoxy, halogen, carboxyl, sulpho, ureido or $C_2-C_6$-alkanoylamino which is optionally substituted in the alkyl part and

- $A_1$ is a radical of the formula

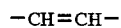 (5)

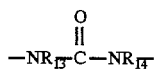 (6)

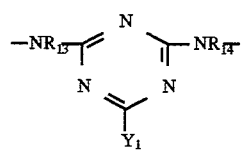 (7)

or

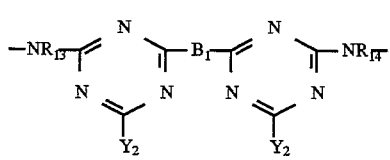 (8)

and $A_2$ is a radical of the formula

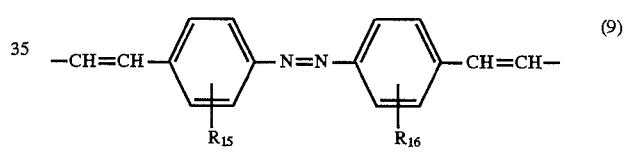 (9)

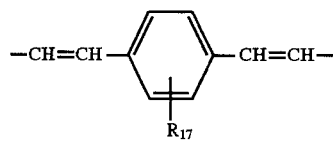 (10)

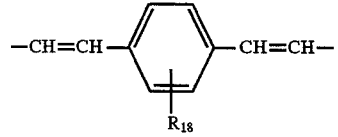 (11)

wherein $R_{13}$ and $R_{14}$ denote hydrogen or optionally substituted $C_1-C_8$-alkyl, $Y_1$ in the radical of the formula (7) and $Y_2$ in the radical of the formula (8) denote hydroxyl, $C_1-C_4$-alkoxy, chlorine, bromine, $C_1-C_4$-alkylthio, amino, N-mono- or N,N-di-$C_1-C_4$-alkylamino which is unsubstituted or substituted by hydroxyl, sulpho, carboxyl or $C_1-C_4$-alkoxy in the alkyl part, cyclohexylamino, phenylamino which is unsubstituted or substituted by $C_1-C_4$-alkyl, $C_1-C_4$-alkoxy, carboxyl, sulpho and/or halogen in the phenyl part, or N-$C_1-C_4$-alkyl-N-phenylamino, morpholino or 3-carboxy- or 3-carbamoylpyridin-1-yl, $B_1$ in the radical of the formula (8) is a bridge member and $R_{15}$, $R_{16}$, $R_{17}$ and $R_{18}$ denote hydrogen, $C_1-C_8$-alkyl, halogen, carboxyl, sulpho, ureido or $C_2-C_6$-alkanoylamino which is optionally substituted in the alkyl part.

Possible halogen for $R_5$, $R_6$, $R_7$, $R_8$, $R_9$, $R_{10}$, $R_{11}$ and $R_{12}$ in the formulae (3) and (4) and $R_{15}$, $R_{16}$, $R_{17}$ and $R_{18}$ in the formulae (9) to (11) are, independently of one another, for example, fluorine, bromine or, in particular, chlorine.

Possible $C_1$–$C_8$-alkyl for $R_5$, $R_6$, $R_7$, $R_8$, $R_9$, $R_{10}$, $R_{11}$ and $R_{12}$ in the formulae (3) and (4), $R_{13}$ and $R_{14}$ in the formulae (6) to (8) and $R_{15}$, $R_{16}$, $R_{17}$ and $R_{18}$ in the formulae (9) to (11) are independently of one another, for example, methyl, ethyl, propyl, isopropyl, butyl, sec-butyl, tert-butyl, isobutyl, pentyl, hexyl, heptyl and octyl. $R_5$ to $R_{18}$ are preferably $C_1$–$C_8$-alkyl.

The radicals $R_{13}$ and $R_{14}$ in the formulae (6) to (8) as $C_1$–$C_8$-alkyl can be substituted, for example by $C_1$–$C_4$-alkoxy, $C_1$–$C_4$-alkoxycarbonyl, hydroxyl, halogen, such as, for example, chlorine or fluorine, carboxyl, cyano, sulpho or sulphato.

Examples which may be mentioned are carboxymethyl, β-carboxyethyl, methoxycarbonylmethyl, ethoxycarbonylmethyl, β-methoxyethyl, β-ethoxyethyl, β-chloroethyl, γchloropropyl, β-hydroxyethyl, β-hydroxybutyl, β-cyanoethyl, sulphomethyl, β-sulphoethyl and β-sulphatoethyl.

$R_{13}$ and $R_{14}$ preferably have the same meanings. Preferably, $R_{13}$ and $R_{14}$ are hydrogen or $C_1$–$C_4$-alkyl, in particular hydrogen.

Possible $C_1$–$C_8$-alkanoylamino for $R_5$, $R_6$, $R_7$, $R_8$, $R_9$, $R_{10}$, $R_{11}$ and $R_{12}$ in the formulae (3) and (4) and $R_{15}$, $R_{16}$, $R_{17}$ and $R_{18}$ in the formulae (9) to (11) is, in particular, $C_1$–$C_4$-alkoxy, such as methoxy, ethoxy, propoxy, isopropoxy, butoxy, sec-butoxy, isobutoxy or tert-butoxy.

Possible $C_2$–$C_8$-alkanoylamino for $R_5$, $R_6$, $R_7$, $R_8$, $R_9$, $R_{10}$, $R_{11}$ and $R_{12}$ in the formulae (3) and (4) and $R_{15}$, $R_{16}$, $R_{17}$ and $R_{18}$ in the formulae (9) to (11) are, in particular, $C_2$–$C_4$-alkanoylamino, such as, for example, acetylamino or propionylamino. Possible $C_2$–$C_6$-alkanoylamino which is substituted in the alkyl part are, for example, the radicals substituted by carboxyl or, in particular, hydroxyl.

Possible arylazo for $R_5$ and $R_6$ in the formula (3) are, independently of one another, for example, naphthylazo or, preferably, phenylazo radicals, wherein the radicals mentioned can in each case be unsubstituted or further substituted, for example by sulpho, $C_1$–$C_4$-alkyl, $C_1$–$C_4$-alkoxy- and/or halogen. This radical is, in particular, a phenylazo radical which is unsubstituted or substituted by sulpho, methyl, methoxy and/or chlorine.

Examples of substituents $Y_1$ in the formula (7) and $Y_2$ in the formula (8) are hydroxyl, methoxy, ethoxy, n- or isopropoxy, chlorine, methylthio, ethylthio, amino, methylamino, ethylamino, carboxymethylamino, β-hydroxyethylamino, N,N-di-β-hydroxyethylamino, β-sulphoethylamino, phenylamino, o-, m- or p-methylphenylamino, o-, m- or p-methoxyphenylamino, o-, m- or p-chlorophenylamino, o-, m- or p-sulphophenylamino, 2,4- or 2,5-disulphophenylamino, o-carboxyphenylamino, N-ethyl-N-phenylamino, N-methyl-N-phenyl amino and morpholino.

Preferably, $Y_1$ and $Y_2$ independently of one another are chlorine, amino, N-mono- or N,N-di-$C_1$–$C_4$-alkylamino which is unsubstituted or substituted by hydroxyl in the alkyl part, phenylamino or morpholino, in particular morpholino or chlorine.

Possible bridge members $B_1$ in formula (8) are, for example, the radicals of the formulae

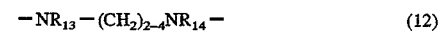 (12)

 (12a)

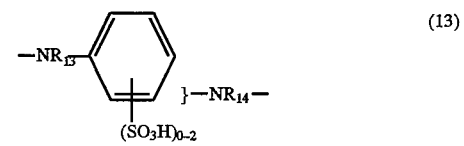 (13)

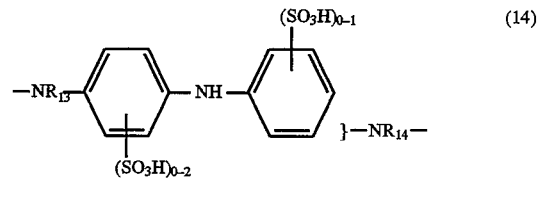 (14)

and

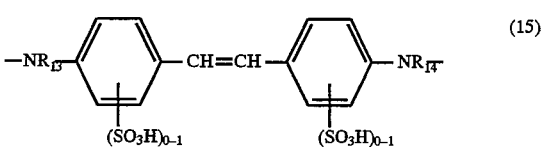 (15)

wherein $R_{13}$ and $R_{14}$ have the abovementioned meanings and preferred meanings. Preferably, $B_1$ is a radical of the formula (12a).

Dyestuffs which are preferably used are those of the formulae (3) and (4) wherein $R_5$, $R_6$, $R_7$, $R_8$, $R_9$, $R_{10}$, $R_{11}$ and $R_{12}$ and $R_{15}$, $R_{16}$, $R_{17}$ and $R_{18}$ in the formulae (9) to (11) are hydrogen, $C_1$–$C_4$-alkyl, $C_1$–$C_4$-alkoxy, $C_1$–$C_4$-alkanoylamino, halogen or sulpho, and $R_5$, $R_6$, $R_7$ and $R_8$ in the formulae (3) and (4) and $R_{15}$, $R_{16}$, $R_{17}$ and $R_{18}$ in the formulae (9) to (11) are, in particular, hydrogen or sulpho.

Dyestuffs which are particularly preferably used are those of formulae (3), (4) and (9) to (11) wherein $R_5$, $R_6$, $R_7$, $R_8$, $R_{15}$, $R_{16}$, $R_{17}$ and $R_{18}$ are hydrogen or sulpho, $R_9$, $R_{10}$, $R_{11}$ and $R_{12}$ are hydrogen, $C_1$–$C_4$-alkyl, $C_1$–$C_4$-alkoxy, $C_2$–$C_4$-alkanoylamino, halogen or sulpho, $B_1$ is a radical of the formula (12a) and $Y_1$ and $Y_2$ are chlorine, amino, N-mono- or N,N-di-$C_1$–$C_4$-alkylamino which is unsubstituted or substituted by hydroxyl in the alkyl part, phenylamino or morpholino, in particular morpholino or chlorine.

Dyestuffs of the formulae (3) and (4) which are of particular interest for the process according to the invention are the dyestuffs of the formulae (16) to (25)

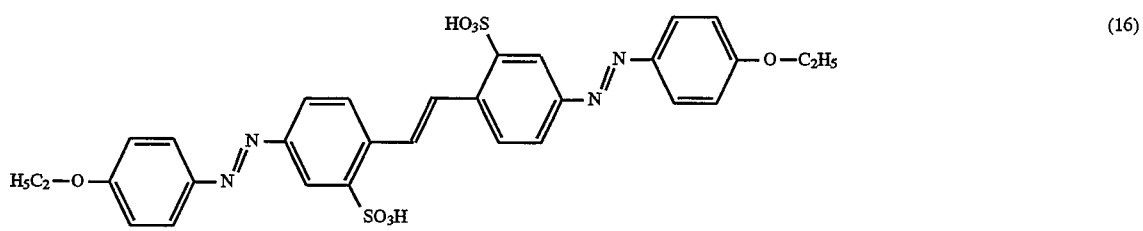 (16)

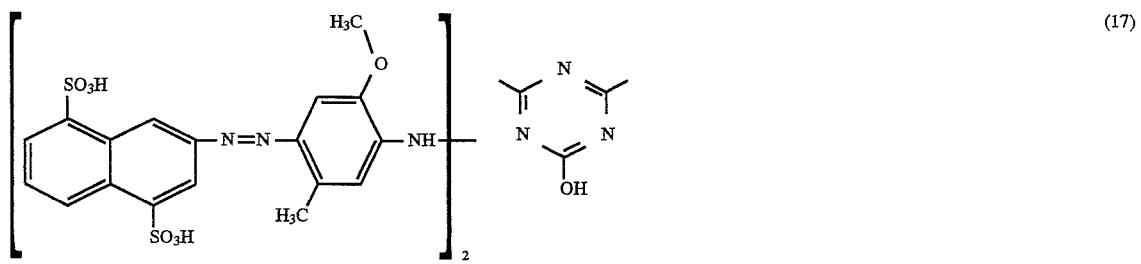
(17)
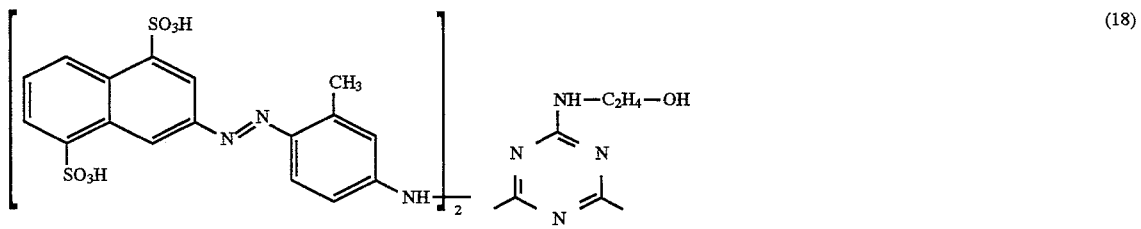
(18)
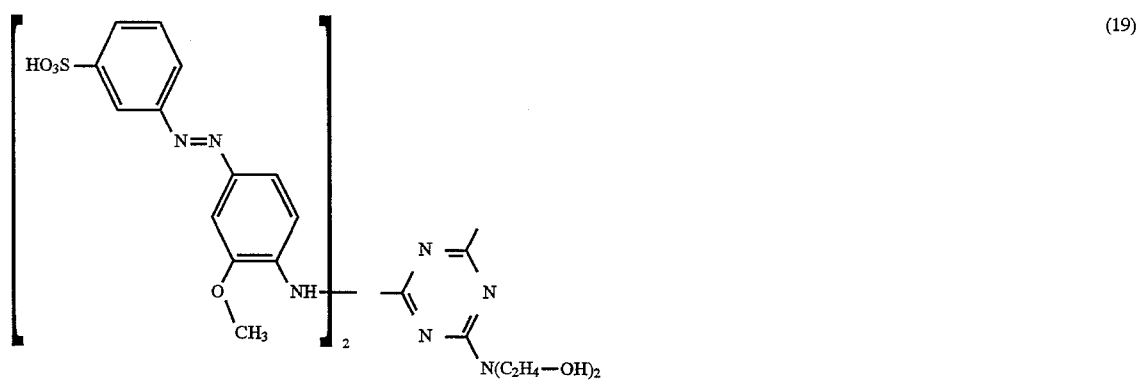
(19)
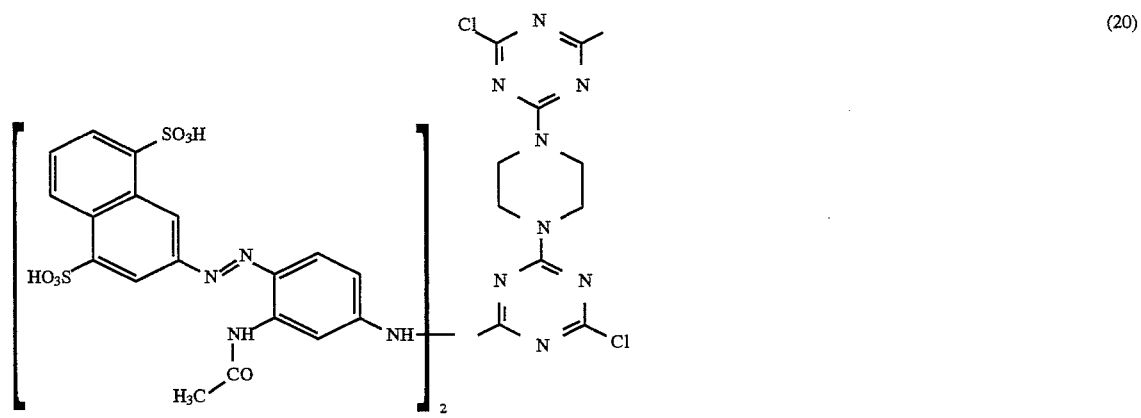
(20)
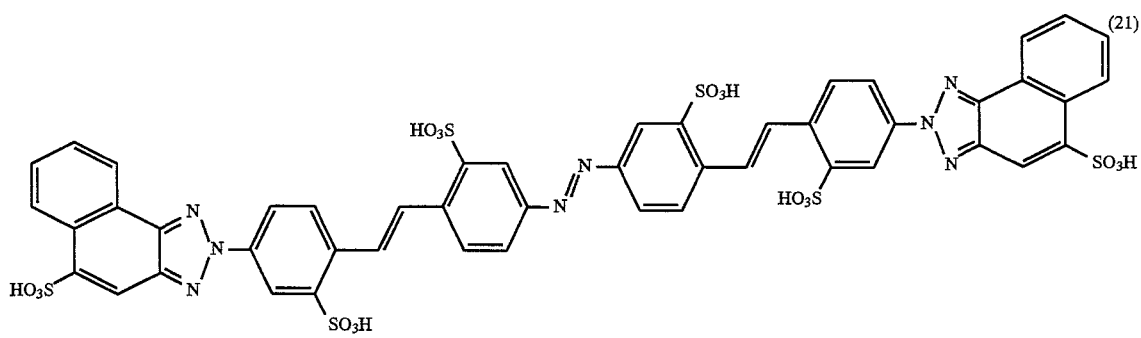
(21)

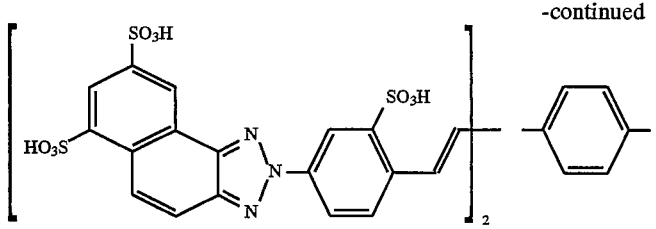
(22)

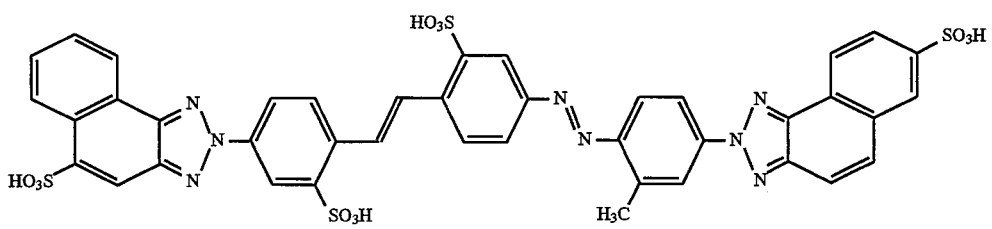
(23)

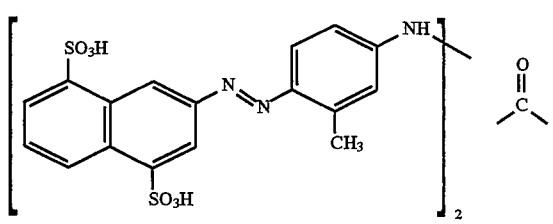
(24)

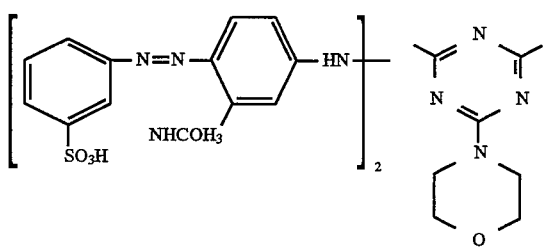
(25)

in particular the dyestuffs (18), (19), (23) and (25).

Red-dyeing dyestuffs which are used for the process according to the invention are preferably at least one dyestuff of the formulae (26) to (31)

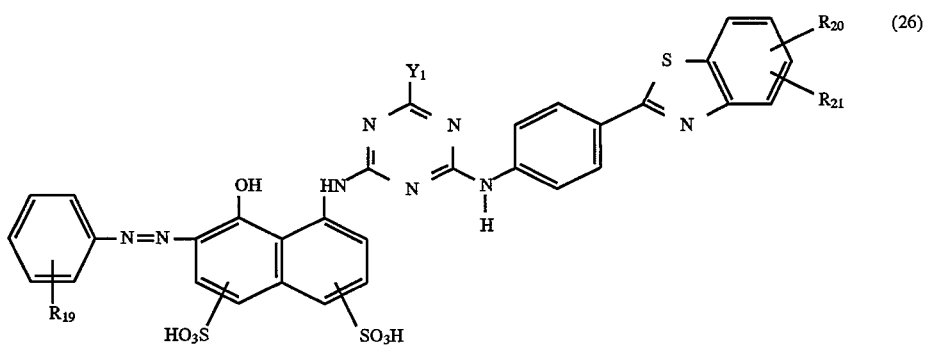
(26)

wherein $R_{19}$, $R_{20}$ and $R_{21}$ denote hydrogen, optionally substituted $C_1$-$C_8$-alkyl or $C_1$-$C_8$-alkoxy, halogen, carboxyl, sulpho, ureido or $C_2$-$C_6$-alkanoylamino which is optionally substituted in the alkyl part and $Y_1$ has the abovementioned meanings and preferred meanings, (27)

wherein $R_{22}$, $R_{23}$, $R_{24}$, $R_{25}$, $R_{26}$ and $R_{27}$ denote hydrogen, optionally substituted $C_1$-$C_8$-alkyl or $C_1$-$C_8$-alkoxy, halogen, carboxyl, sulpho, ureido or $C_2$-$C_6$-alkanoylamino which is optionally substituted in the alkyl part and A₃ is a radical of the formula

—NH—, $$-NR-\overset{O}{\overset{\|}{C}}-NR'-$$

or

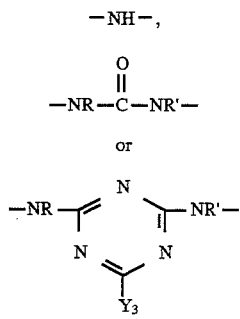

wherein R and R' denote hydrogen or optionally substituted $C_1$–$C_8$-alkyl and $Y_3$ denotes hydroxyl, $C_1$–$C_4$-alkoxy, chlorine, bromine, $C_1$–$C_4$-alkylthio, amino, N-mono- or N,N-di-$C_1$–$C_4$-alkylamino which is unsubstituted or substituted by hydroxyl, sulpho, carboxyl or $C_1$–$C_4$-alkoxy in the alkyl part, cyclohexylamino, phenylamino which is unsubstituted or substituted by $C_1$–$C_4$-alkyl, $C_1$–$C_4$-alkoxy, carboxyl, sulpho and/or halogen in the phenyl part, or N-$C_1$–$C_4$-alkyl-N-phenylamino, morpholino or 3-carboxy- or 3-carbamoylpyridin-1-yl,

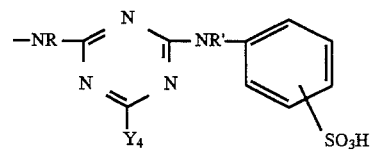

which is optionally further substituted in the phenyl ring and wherein R and R' are hydrogen or optionally substituted $C_1$–$C_8$-alkyl and $Y_4$ has the meanings given above for $Y_3$ under formula (27),

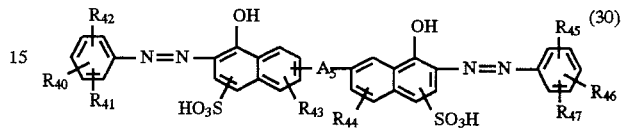

where, $R_{40}$, $R_{41}$, $R_{42}$, $R_{43}$, $R_{44}$, $R_{45}$, $R_{46}$ and $R_{47}$ are hydrogen, optionally substituted $C_1$–$C_8$-alkyl or $C_1$–$C_8$-alkoxy, hydrogen, carboxyl, sulpho, ureido or $C_2$–$C_6$-alkanoylamino which is optionally substituted in the alkyl part, and wherein $R_{40}$ and $R_{46}$ can additionally denote phenylazo which is optionally substituted in the phenyl ring, and $A_5$ has the meanings given above for $A_3$ under formula (27), or is a radical of the formula

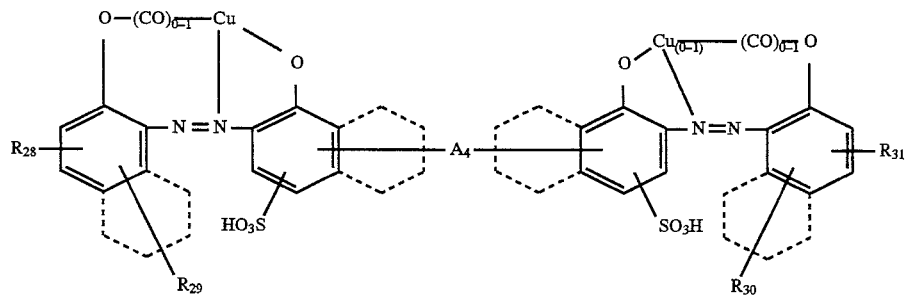

wherein $R_{28}$, $R_{29}$, $R_{30}$ and $R_{31}$ are hydrogen, optionally substituted $C_1$–$C_4$-alkyl or $C_1$–$C_8$-alkoxy, halogen, carboxyl, sulpho, ureido, sulphamoyl or $C_2$–$C_6$-alkanoylamino which is optionally substituted in the alkyl part and $A_4$ has the meanings given above for $A_3$ under formula (27),

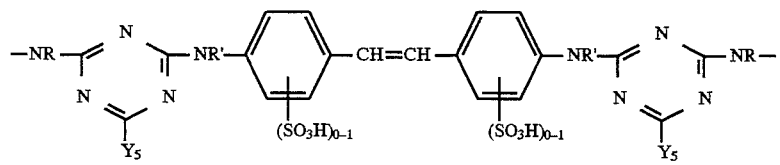

wherein R and R' are hydrogen or optionally substituted $C_1$–$C_8$-alkyl and $Y_5$ has the meanings given above for $Y_3$ under formula (27),

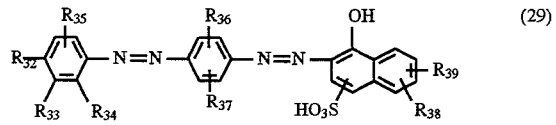

wherein $R_{32}$, $R_{33}$, $R_{34}$, $R_{35}$, $R_{36}$, $R_{37}$ and $R_{38}$ are hydrogen, optionally substituted $C_1$–$C_8$-alkyl or $C_1$–$C_8$-alkoxy, halogen, carboxyl, sulpho, ureido or $C_2$–$C_6$-alkanoylamino which is optionally substituted in the alkyl part and $R_{39}$ is benzoylamino which is optionally substituted in the phenyl ring or a radical of the formula

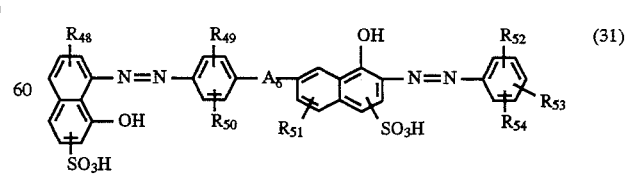

wherein $R_{48}$, $R_{49}$, $R_{50}$, $R_{51}$, $R_{52}$, $R_{53}$ and $R_{54}$ are hydrogen, optionally substituted $C_1$–$C_8$-alkyl or $C_1$–$C_8$-alkoxy, halogen, carboxyl, sulpho, ureido or $C_2$–$C_6$-alkanoylamino which is optionally substituted in the alkyl part, and wherein $R_{53}$ can additionally denote phenylazo which is optically substituted in the phenyl ring, and $A_6$ has the meanings given above for $A_3$ under for formula (27).

Possible halogen for $R_{19}$, $R_{20}$ and $R_{21}$ in formula (26), $R_{22}$, $R_{23}$, $R_{24}$, $R_{25}$, $R_{26}$, and $R_{27}$ in the formula (27), $R_{28}$, $R_{29}$, $R_{30}$ and $R_{31}$, in formula (28), $R_{32}$, $R_{33}$, $R_{34}$, $R_{35}$, $R_{37}$, and $R_{38}$ in formula (29), $R_{40}$, $R_{41}$, $R_{42}$, $R_{43}$, $R_{44}$, $R_{45}$, $R_{46}$, and $R_{47}$ in formula (30) and $R_{48}$, $R_{49}$, $R_{50}$, $R_{51}$, $R_{52}$, $R_{53}$ and $R_{54}$ in formula (31) and independently of one another are, for example, fluorine, bromine or, in particular, chlorine.

Possible optionally substituted $C_1$–$C_8$-alkyl for the abovementioned substituents for the dyestuffs of the formulae (26) to (31) and for R and R' is, in particular, $C_1$–$C_4$-alkyl, such as methyl, ethyl, propyl, isopropyl, butyl, sec-butyl, tert-butyl or isobutyl, and the radicals substituted, for example, by $C_1$–$C_4$-alkoxy, $C_1$–$C_4$-alkoxycarbonyl, hydroxyl, halogen, such as, for example, chlorine or fluorine, carboxyl, cyano, sulpho or sulphato.

The abovementioned meanings and preferred meanings apply to R and R'.

Possible optionally substituted $C_1$–$C_8$-alkoxy for the abovementioned substituents of the dyestuffs of the formulae (26) to (31) is, in particular, $C_1$–$C_4$-alkoxy, such as methoxy, ethoxy, propoxy, isopropoxy, butoxy, sec-butoxyl, isobutoxy or tert-butoxy, in the radicals substituted, for example, by hydroxyl or carboxyl.

Possible $C_2$–$C_6$-alkanoylamino for the abovementioned substituents of the dyestuffs of the formulae (26) to (31) is, in particular, $C_2$–$C_4$-alkanoylamino, such as, for example, acetylamino or propionylamino. Possible $C_2$–$C_6$-alkanoylamino which is substituted in the alkyl part are, for example, the radicals substituted by hydroxyl.

$R_{39}$ as benzoylamino or as a radical of the formula

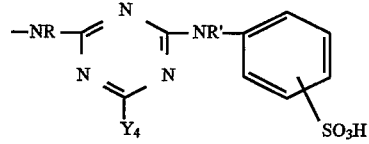

and radicals $R_{40}$, $R_{46}$ and $R_{53}$ as phenylazo can be unsubstituted or substituted in the phenyl ring. Examples of substituents which may be mentioned are halogen, amino, sulpho, carboxyl, ureido, $C_2$–$C_4$-alkanoylamino which is optionally further substituted by hydroxyl in the alkyl part, $C_1$–$C_4$-alkyl, $C_1$–$C_4$-alkoxy which is optionally further substituted by hydroxyl, and benzoylamino or phenylamino which is optionally further substituted by carboxyl, halogen, sulpho, $C_1$–$C_4$alkyl or $C_1$–$C_4$-alkoxy in the phenyl ring, in particular halogen, sulpho or $C_1$–$C_4$-alkyl.

The meanings and preferred meanings mentioned above for $Y_1$ and $Y_2$ apply to $Y_3$, $Y_4$ and $Y_5$.

Red-dyeing dyestuffs which are used for the process according to the invention are preferably at least one dyestuff of the formulae (32) (44)

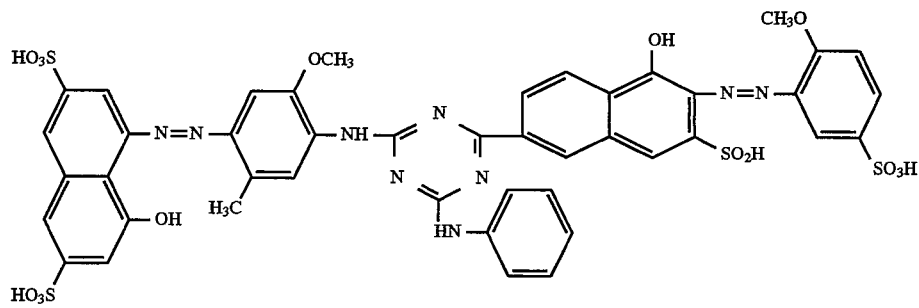

(32)

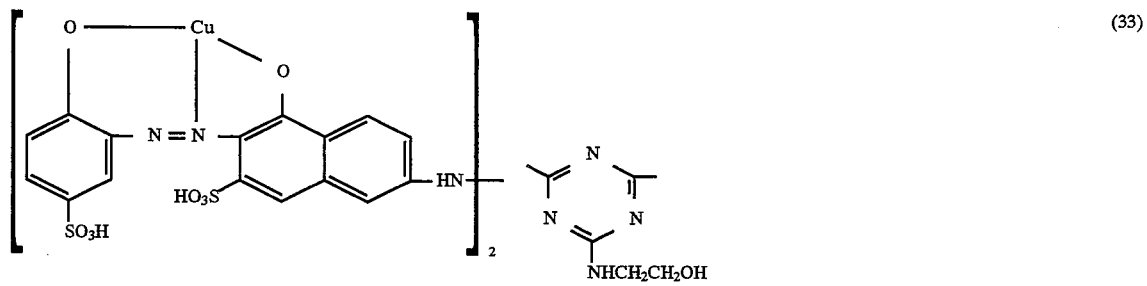

(33)

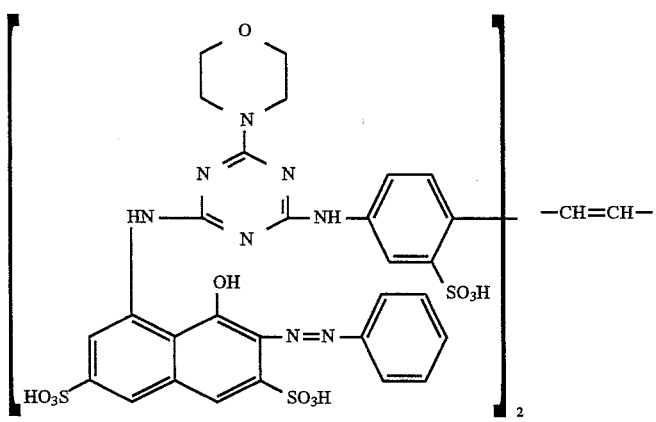
(34)
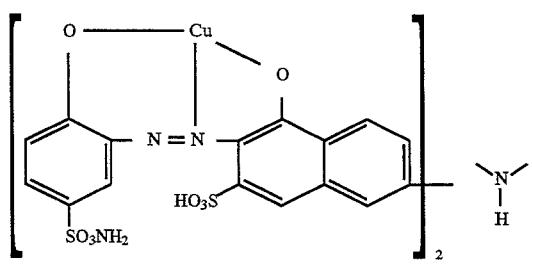
(35)
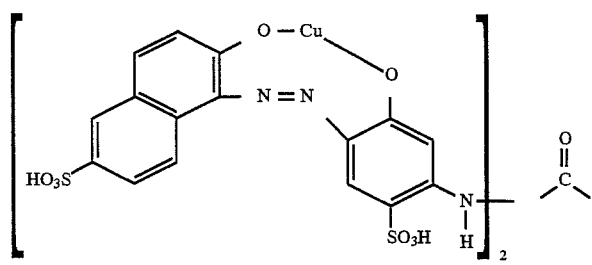
(36)
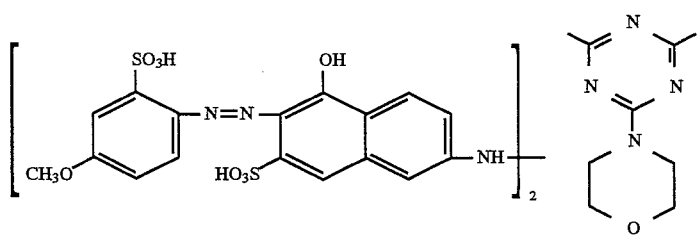
(37)
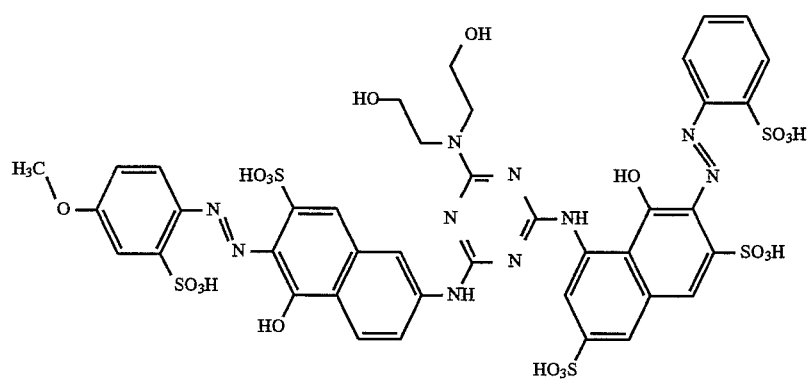
(38)

-continued
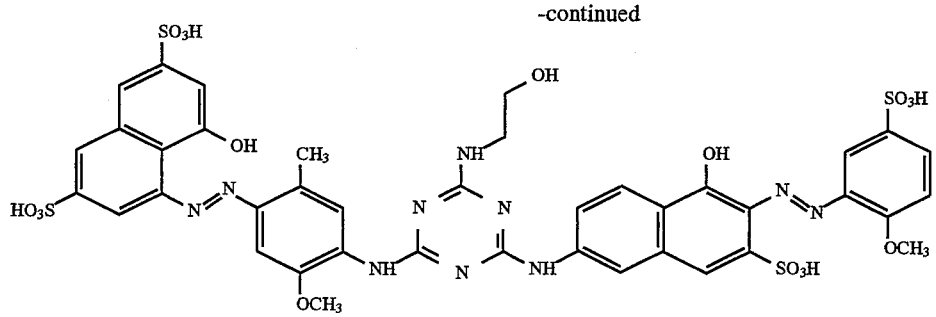 (39)
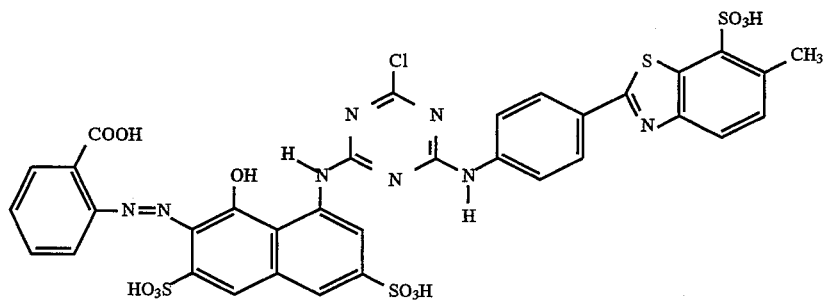 (40)
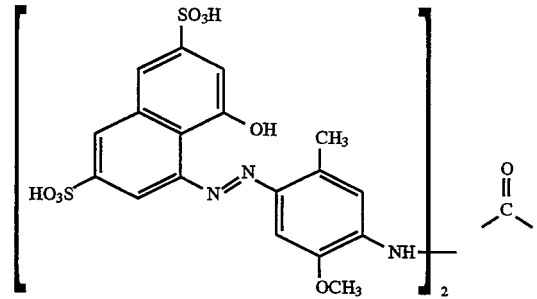 (41)
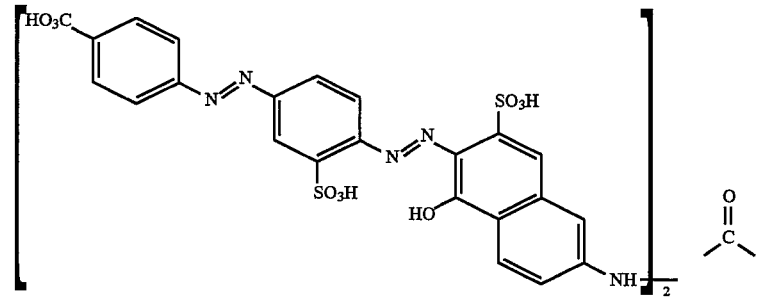 (42)
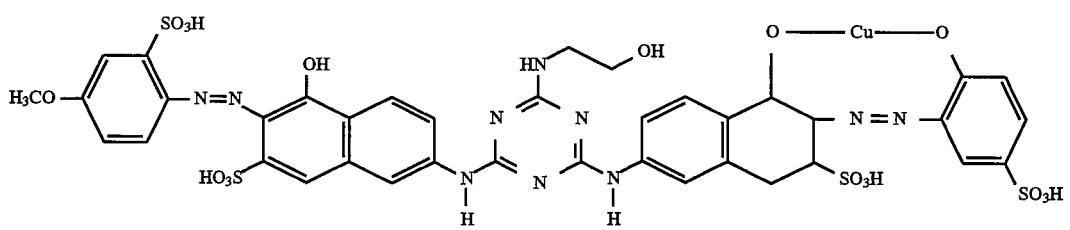 (43)
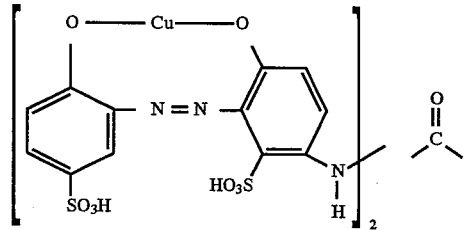 (44)

in particular dyestuffs of the formulae (32), (35), (37) to (40) and (43).

Navy blue- or black-dyeing dyestuffs which are used in the process according to the invention are preferably at least one dyestuff of the formulae (45) to (48)

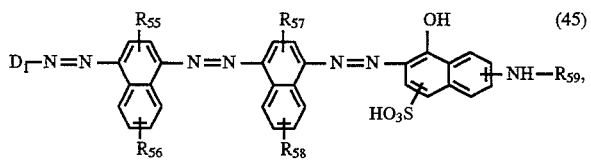
(45)

wherein $D_1$ denotes optionally substituted phenyl or naphthyl, $R_{55}$, $R_{56}$, $R_{57}$ and $R_{58}$ denote hydrogen, optionally substituted $C_1$–$C_8$-alkyl or $C_1$–$C_8$-alkoxy, halogen, carboxyl, sulpho, ureido or $C_2$–$C_6$-alkanoylamino which is optionally substituted in the alkyl part and $R_{59}$, denotes hydrogen, optionally substituted $C_1$–$C_8$-alkyl, $C_2$–$C_6$-alkanoyl which is optionally substituted in the alkyl part or phenyl or benzoyl which is optionally substituted in the phenyl ring,

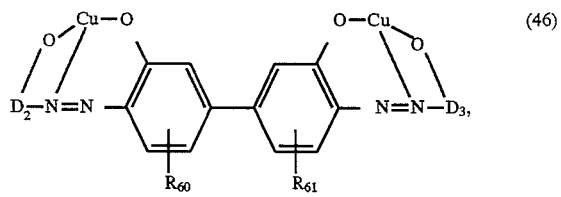
(46)

and $D_2$ and $D_3$ denote hydrogen, optionally substituted wherein $R_{60}$ and $R_{61}$ denote optionally substituted $C_1$–$C_8$-alkyl or $C_1$–$C_8$-alkoxy, halogen, carboxyl, sulpho, ureido or $C_2$–$C_6$-alkanoyl which is optionally substituted-in the alkyl part,

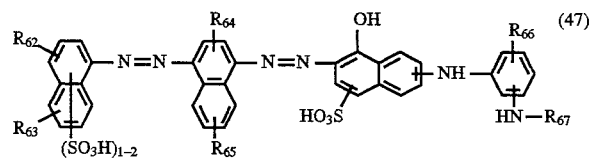
(47)

wherein $R_{62}$, $R_{63}$, $R_{64}$, $R_{65}$ and $R_{66}$ denote hydrogen, optionally substituted $C_1$–$C_8$-alkyl or $C_1$–$C_8$-alkoxy, halogen, carboxyl, sulpho, ureido or $C_2$–$C_6$-alkanoylamino which is optionally substituted in the alkyl part and $R_{67}$ denotes hydrogen, optionally substituted $C_1$–$C_8$-alkyl, optionally substituted $C_2$–$C_6$-alkanoyl or phenyl or benzoyl which is optionally substituted in the phenyl ring, carboxyl, sulpho, ureido or $C_2$–$C_6$-alkanoylamino which is optionally substituted in the alkyl part.

Possible halogen for $R_{55}$, $R_{56}$, $R_{57}$ and $R_{58}$ in the formula (45), $R_{60}$ and $R_{61}$ in the formula (46), $R_{62}$, $R_{63}$, $R_{64}$, $R_{65}$ and $R_{66}$ in the formula (47) and $R_{68}$, $R_{69}$, $R_{70}$ and $R_{71}$ in the formula (48) are, independently of one another, for $R_{55}R_{56}$, example, fluorine, bromine or, in particular, chlorine.

Possible optionally substituted $C_1$–$C_8$-alkyl for $R_{57}$ and $R_{58}$ in the formula (45), $R_{60}$ and $R_{61}$ in the formula (46), $R_{62}$, $R_{63}$, $R_{64}$, $R_{65}$ and $R_{66}$ in the formula (47) and $R_{68}$, $R_{69}$, $R_{70}$ and $R_{71}$ in the formula (48) are, in particular, $C_1$–$C_4$-alkyl, such as, for example, methyl, ethyl, propyl, isopropyl, butyl, sec-butyl, tert-butyl and isobutyl, and the radicals substituted, for example, by $C_1$–$C_4$-alkoxy, $C_1$–$C_4$-alkoxycarbonyl, hydroxyl, halogen, such as, for example, chlorine or fluorine, carboxyl, cyano, sulpho or sulphato.

Possible $C_1$–$C_8$-alkoxy for $R_{55}$, $R_{56}$, $R_{57}$ and $R_{58}$ in the formula (45), $R_{60}$ and $R_{61}$ in the formula (46), $R_{62}$, $R_{63}$, $R_{64}$, $R_{65}$ and $R_{66}$ in the formula (47) and $R_{68}$, $R_{69}$, $R_{70}$ and $R_{71}$ in the formula (48) are, in particular, $C_1$–$C_4$-alkoxy, such as methoxy, ethoxy, propoxy, isopropoxy, butoxy, sec-butoxy, isobutoxy or tert-butoxy.

Possible $C_2$–$C_6$-alkanoylamino for $R_{55}$, $R_{56}$, $R_{57}$ and $R_{58}$ in the formula (45), $R_{60}$ and $R_{61}$ in the formula (46), $R_{62}$, $R_{63}$, $R_{64}$, $R_{65}$ and $R_{66}$ in the formula (47) and $R_{68}$, $R_{69}$, $R_{70}$ and $R_{71}$ in the formula (48) are, in particular, $C_2$–$C_4$-alkanoylamino, such as, for example, alkylamino or propionylamino. Possible $C_2$–$C_6$-alkanoylamino which is substituted in the alkyl part are, for example, the radicals substituted by carboxyl or, in particular, hydroxyl.

Possible $C_2$–$C_6$-alkanoyl for $R_{59}$ in formula (45) and $R_{67}$ in formula (47) is, in particular, $C_2$–$C_4$-alkanoyl, such as, for example, acetyl or propionyl. Possible $C_2$–$C_6$-alkanoyl which is substituted in the alkyl part are, for example, the radicals substituted by hydroxyl.

The radicals $D_1$ as phenyl or naphthyl, $D_2$ and $D_3$ as naphthyl and $R_{59}$ and $R_{67}$ as phenyl or benzoyl can be unsubstituted or substituted. Examples of substituents which may be mentioned are halogen, amino, sulpho, carboxyl, ureido, $C_2$–$C_4$-alkanoylamino which is optionally further substituted by hydroxyl in the alkyl part, $C_1$–$C_4$-alkyl, $C_1$–$C_4$-alkoxy which is optionally further substituted by hydroxyl or carboxyl and benzoylamino or phenylamino which is optionally further substituted by carboxyl, halogen, sulpho, $C_1$–$C_4$-alkyl or $C_1$–$C_4$-alkoxy in the phenyl ring.

Navy blue- or black-dyeing dyestuffs which are used for the process according to the invention are preferably at least one dyestuff of the formulae (49) to (56)

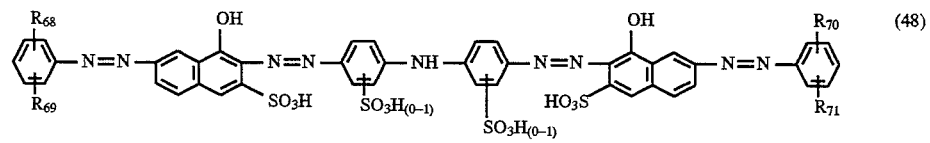
(48)

wherein $R_{68}$, $R_{69}$, $R_{70}$ and $R_{71}$ denote hydrogen, optionally substituted $C_1$–$C_8$-alkyl or $C_1$–$C_8$-alkoxy, halogen,

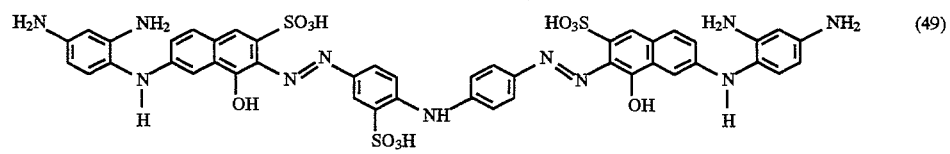
(49)

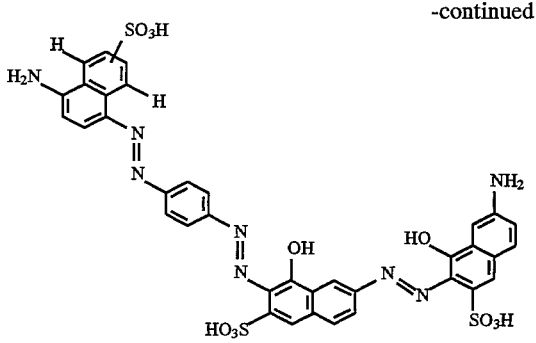
(50)

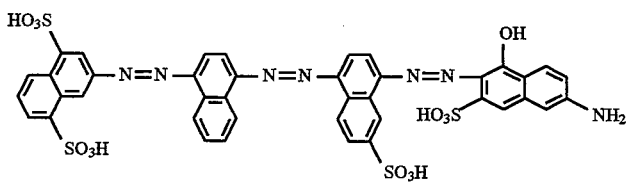
(51)

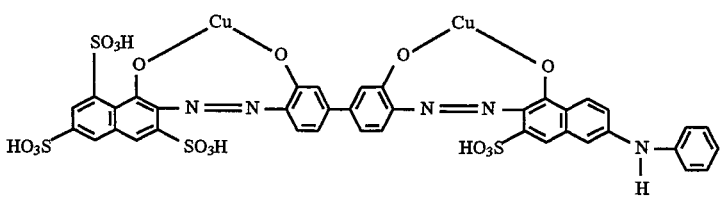
(52)

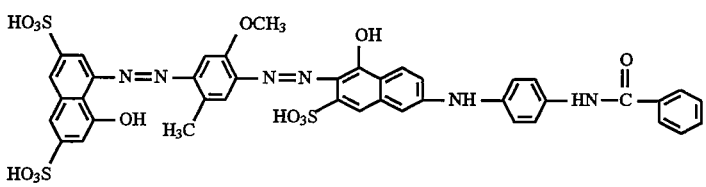
(53)

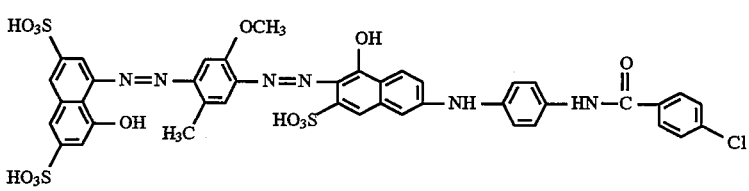
(54)

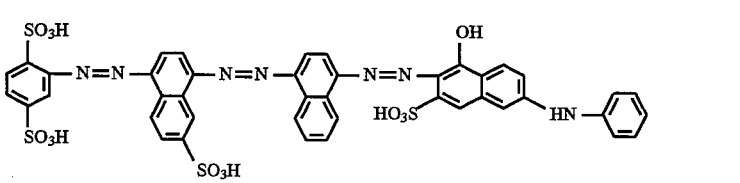
(55)

and

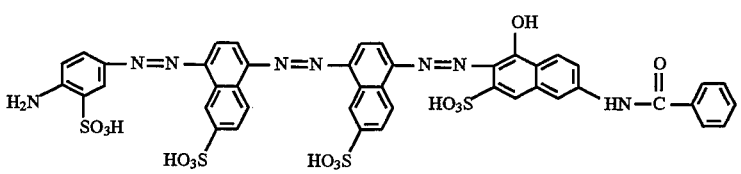
(56)

in particular dyestuffs of the formulae (49) to (52).

Particularly preferably, at least one blue-dyeing dyestuff of the formula (1) is used together with at least one yellow-dye n dyestuff of the formulae (16) to (25) or at least one red-dyeing dyestuff of the formulae (26) to (31) or at least one navy blue- or black-dyeing dyestuff of the formulae (49) to (56).

Especially preferably, at least one blue-dyeing dyestuff of the formulae (2a) to (2h) is used together with at least one yellow-dyeing dyestuff of the formulae (18), (19), (23) or (25) or at least one red-dyeing dyestuff of the formulae (32), (35), (37) to (40) or (43) or at least one navy blue- or black-dyeing dyestuff of the formulae (49) to (52), possible blue-dyeing dyestuffs preferably being the dyestuffs of the formula (2a) or (2b).

In a particularly important embodiment of the process according to the invention, a blue-dyeing dyestuff of the formula (2a) is used together with a yellow-dyeing dyestuff of the formula (19) or together with a red-dyeing dyestuff of the formula (38) or (40) or together with a navy blue- or black-dyeing dyestuff of the formula (49), (51) or (52).

The process of the present invention is particularly suitable for dichromatic dyeing or printing, at least one blue-dyeing dyestuff of the formula (1) being used together with at least one yellow-dyeing dyestuff or at least one red-dyeing dyestuff or at least one navy blue- or black-dyeing dyestuff. The abovementioned meanings and preferred meanings apply here to the dyestuffs to be used for dichromatic dyeing or printing.

Dichromaticity is to be understood here as additive colour of appropriately chosen yellow-, red- and blue-dyeing dyestuffs in the amounts necessary to achieve the desired shade.

The blue-dyeing dyestuffs of the formula (1) used for the process according to the invention and the yellow-dyeing dyestuffs of the formulae (3) and (4) and the red-dyeing dyestuffs of the formulae (26) to (31) and the navy blue- or black-dyeing dyestuffs of the formulae (45) to (48) are known or can be prepared analogously to known dye-stuffs.

In respect of their dyeing properties, the blue-dyeing dyestuffs of the formula (1) used for the process according to the invention and the yellow-dyeing dyestuffs of the formulae (3) and (4) and the red-dyeing dyestuffs of the formulae (26) to (31) and the navy blue- or black-dyeing dyestuffs of the formulae (45) to (48) can be called directly absorbing or direct dyestuffs (C.I. direct dyes).

The blue-dyeing dyestuffs of the formula (1) used for the process according to the invention and the yellow-dyeing, the red-dyeing and the navy blue- or black-dyeing dyestuffs are present either in the form of their free sulphonic acid or, preferably, as salts thereof, such as, for example, the alkali metal, alkaline earth metal or ammonium salts or as salts of an organic amine.

Examples which may be mentioned are the sodium, potassium, lithium or ammonium salts or the salt of triethanolamine.

The amounts in which the blue-dyeing dyestuffs of the formula (1) and the yellow-dyeing, the red-dyeing and the navy blue- or black-dyeing dyestuffs can be used in the dyebaths or printing pastes for the process according to the invention vary according to the desired depth of colour, and in general amounts of 0.01 to 10% by weight, in particular 0.1 to 6% by weight, based on the goods to be dyed, have proved to be advantageous.

Possible fibre materials containing hydroxyl groups, in particular textile fibre materials, which can be dyed or printed by the process according to the invention are, for example, those of cellulosic fibres, such as cotton, linen or a hemp, in particular cotton, and regenerated cellulose fibres, such as, for example, viscose staple, rap or viscose.

Fibre materials containing hydroxyl groups are likewise to be understood as blended fibres containing such fibre materials. Possible such blended fibres are, for example, those which also comprise naturally occurring or synthetic polyamide fibre materials or polyacrylic or polyester fibre materials, in addition to cellulosic fibre materials. Examples which may be mentioned are wool/cotton, polyamide/cotton, polyacrylic/cotton or, in particular, polyester/cotton blended fibres.

The textile fibre materials can be present in the most diverse states of processing, such as, for example, as fibre, yarn, woven fabric or knitted fabric.

The process according to the invention is suitable for dyeing, for example by the exhaustion method or the cladding method, and for printing in accordance with the generally customary processes used for this purpose.

Dyeing by the exhaustion method is preferred. In this case, dyeing is carried out as a rule at a temperature of 60° to 110° C., in particular 90° to 105° C., at a pH of, for example, up to 10, in particular 7 to 9, preferably from an aqueous liquor at a liquor ratio of 1:5 to 1:80, in particular 1:10 to 1:20.

In a particularly interesting embodiment of the process according to the invention, dyeing is carried out in the presence of a salt, such as, for example, the presence chloride, or alkali metal sulphate. In this case, the amount of salt is added in its entirety or in portions shortly before or after the dyeing temperature has been reached. The ran e shortly before the dyeing temperature has been reached is to be understood as meaning, for example, the range of heating up in order to reach the dyeing temperature, such as, for example, the temperature range from 80° to 98° C. Preferably, the salt is added directly here when the dyeing temperature is reached. The use of a total amount of salt which depends on the total amount of dyestuffs employed has proved to be advantageous for this embodiment of the process according to the invention. A total amount of salt which increases with the total amount of dyestuffs employed is as a rule used here. In this case, 6 to 12 g/l of salt, for example, are used up to a total amount of dyestuff of 1%, 12 to 20 g/l of salt, for example, are used up to a total amount of dyestuff of 2%, and 20 to 40 g/l of salt, for example, are used above a total amount of dyestuff of 2%. The amounts stated for the dyestuffs here are percentages by weight, based on the fibre material employed, and as a rule correspond to the dyestuffs as they are obtained after synthesis, for example by salting out.

Dyeing by the exhaustion method is preferred for this embodiment of the process according to the invention.

Fibre materials, in particular textile fibre materials, of blended fibres, such as, for example, of wool/cotton, polyamide/cotton, polyacrylic/cotton or, in particular, polyester/cotton blended fibres can likewise be dyed by the one-bath dyeing process and in the presence of dyestuffs for the other particular types of fibre.

Thus, fibre mixtures of synthetic fibres and cellulosic fibre materials, in particular polyester/cotton blended fabrics, can be dyed under the dyeing conditions for the synthetic fibres the presence of a disperse dyestuff for the synthetic fibres. Possible synthetic fibres are, in particular, polyester fibres. If dyeing is carried out in accordance with this embodiment in the presence of salts, such as, for example, an alkali metal halide or an alkali metal sulphate, the addition of the total amount of salt at the start of the dyeing process is preferred.

The dyestuffs used for the process according to the invention can be readily combined with other dyestuffs, in particular disperse dyestuffs. The dyestuffs used for the process according to the invention have an adequate high temperature stability and can thus be used for dyeing under the dyeing conditions for polyester fibres, that is to say at temperatures in the range from about 100° to 150° C., preferably from 120° to 130° C., from an aqueous liquor and: at a pH of 4 to 7.5, preferably 5 to 7.

It is thus possible to employ customary disperse dyestuffs together with the dyestuffs used for the process according to the invention in a one-stage, one-bath process for dyeing polyester/cotton blended fibres (blended fabric), the two types of fibre being dyed uniformly and in a fast manner by the particular dyestuff. If a disperse dyestuff with the same shade as the dyestuff mixture used for the process according to the invention is used, it is also possible to obtain solid dyeings.

According to this embodiment of the process according to the invention, dyeing of textile blended fibres (blended fabrics), for example, those of polyester and cellulose fibres, can be simplified substantially. The dyeing of each type of fibre of a fibre mixture in a separate operation using different dyeing conditions, which is customary per se, is therefore no longer necessary.

The dyestuffs used for the process according to the invention are distinguished by a uniform colour build-up coupled with a constancy of shade in various concentrations and a good ability to be combined. Dyeings and prints of good fibre and surface levelness and good general fastness properties, in particular good fastnesses to rubbing, wet processing, wet rubbing, perspiration and light, are obtained. If necessary, the wet-fastness properties, in particular the fastness to washing, of the resulting dyeings and prints can be further improved considerably by after-treatment with so-called fixing agents.

The following examples serve to illustrate the invention. Parts and percentages relate to the weight, unless stated otherwise. Parts by weight and parts by volume bear the same relationship to one ether as the kilogram and litre. The temperatures are stated in degrees Celsius.

EXAMPLE 1

10 parts of a non-mercerized cotton fabric are wetted with one part of a nonionic wetting agent at a temperature of 80° C. The cotton fabric pretreated in this way is squeezed off and introduced in a liquor ratio of 1:20 into a dyestuff solution, warned to 40° C., which comprises 0.5% of the blue-eyeing dyestuff of the formula

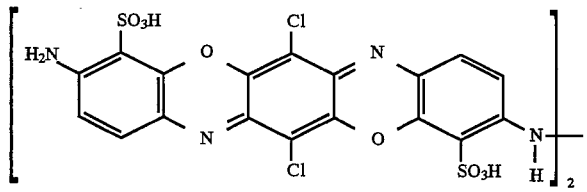

and 0.3% of the yellow-dyeing dyestuff of the formula

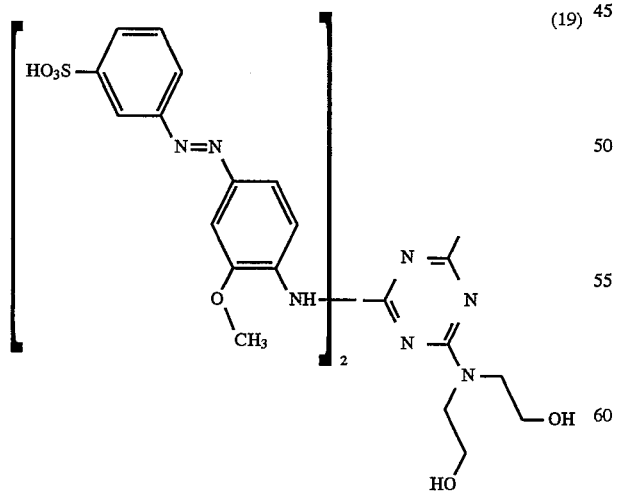

based on the weight of the cotton fabric, in deionized water. The dyebath is left at a temperature of 40° C. for 10 minutes, the temperature of the dyebath is then increased to the boiling temperature at a heating up rate of 2° C./minute, and after dyeing has been carried out at this temperature for 10 minutes, 5 g/l of sodium sulphate are added. Dyeing is continued at the boiling temperature for 20 minutes and the dyebath is then cooled to a temperature of about 80° to 85° C. with a cooling down rate of 2° C./minute and left at this temperature for minutes. The dyed cotton fabric is then removed from the bath, rinsed twice with water for in each case 5 minutes at room temperature, squeezed off and dried at a temperature of about 80° to 90° C. in a drying cabinet. A cotton fabric which has been dyed levelly in a green shade and has good general fastness properties is obtained. To improve the wet-fastness properties, in particular the fastness to washing, the resulting cotton fabric can be after-treated with cationic fixing agents.

EXAMPLES 2 to 18

If the procedure is as described in Example 1, but instead of the dyestuffs described therein, the dyestuffs shown in column 2 in the following table are used in the amounts shown and the amount of sodium sulphate shown in column 3 is used instead of 5 g/l of sodium sulphate, a cotton fabric dyed in the shade shown in column 4 is obtained.

TABLE 1

| Example | Dyestuffs | Sodium sulphate | Shade |
|---|---|---|---|
| 2 | 0.5% (2a) 0.3% (51) | 5 g/l | blue |
| 3 | 0.5% (2a) 0.2% (40) | 5 g/l | pale blue |
| 4 | 0.5% (2a) 0.1% (36) | 5 g/l | reddish blue |
| 5 | 0.5% (2a) 0.3% (34) | 5 g/l | blue-violet |
| 6 | 0.5% (2a) 0.3% (37) | 5 g/l | grey-violet |
| 7 | 0.27% (2a) 0.046% (40) | 3 g/l | pale blue |
| 8 | 0.05% (2a) 1.14% (39) | 10 g/l | brick red |
| 9 | 0.23% (2a) 0.8% (39) | 10 g/l | red-brown |
| 10 | 0.23% (2a) 0.05% (19) | 3 g/l | mint |
| 11 | 0.02% (2a) 0.34% (37) | 3 g/l | antique pink |
| 12 | 0.17% (2a) 0.3% (37) | 4 g/l | lilac |
| 13 | 0.68% (2a) 1.9% (37) | 25 g/l | dark violet |
| 14 | 0.75% (2a) 0.45% (40) | 15 g/l | blue violet |
| 15 | 0.9% (2a) | 25 g/l | navy blue |

TABLE 1-continued

| Example | Dyestuffs | Sodium sulphate | Shade |
|---------|-----------|-----------------|-------|
|  | 1.5% (51) |  |  |
| 16 | 0.6% (2a) | 20 g/l | midnight |
|  | 1.5% (51) |  | blue |
| 17 | 0.9% (2a) | 30 g/l | dark green |
|  | 0.24% (19) |  |  |
| 18 | 0.45% (2a) | 35 g/l | anthracite |
|  | 2.7% (49) |  |  |

EXAMPLE 19

100 parts of thoroughly wetted polyester/cotton woven fabric which comprises 50 parts of polyester and 50 parts of cotton per 100 parts are introduced into a high temperature jet dyeing unit at a temperature of 40° C. The liquor ratio is 1:10. 1 g/l of a levelling auxiliary, 11.6 parts of the dyestuff of the formula (2a), 2.7 parts of the dyestuff (19), 0.55 part of a yellow-dyeing disperse dyestuff of the formula

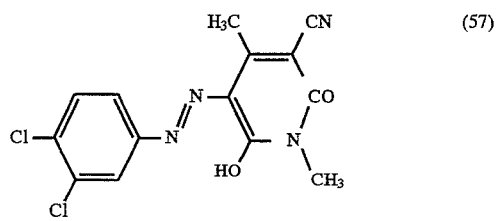 (57)

0.125 part of a yellow brown-dyeing disperse dyestuff of the formula

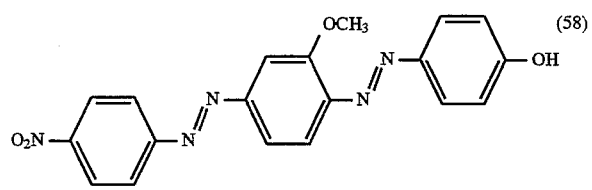 (58)

and 0.5 part of a blue-dyeing disperse dyestuff of the formula

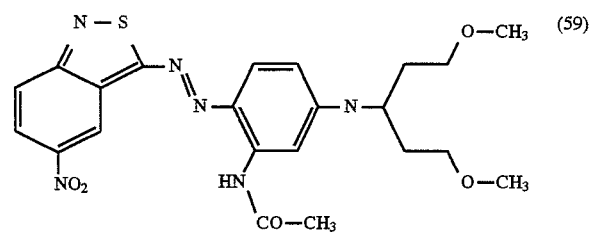 (59)

are then added and the pH is brought to a value of 5.5 to 6 with acetic acid.

The dyed liquor is left at a temperature of 40° C. for 5 minutes and 5 g/l of sodium sulphate are then added. The dyebath is then heated to a temperature of 130° C. at a heating up rate of 1.5° C./minute, kept at this temperature for 30 minutes and then cooled to a temperature of 80° C. at a cooling down rate of 1.5° C./minute. The dyebath is left at the temperature of 80° C. for 20 minutes. The dyebath is now drained and the dyed material is washed twice in water warmed to 30° C. for 5 minutes each time. To finish the dyeing, the dyed goods are dried in the customary manner or finished with a suitable cationic after-treatment agent.

The dyed goods obtained have a green-blue dyeing of excellent levelness.

We claim:

1. A process for dyeing or printing fiber materials containing hydroxyl groups, which comprises applying thereto at least one first blue-dyeing dyestuff of the formula

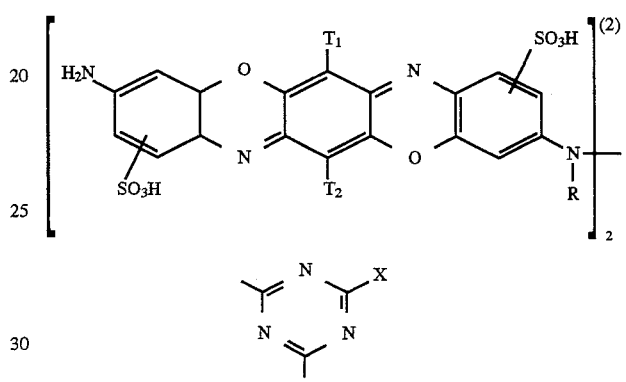 (2)

wherein

R is hydrogen or unsubstituted or substituted alkyl, $T_1$ and $T_2$ each independently is hydrogen, chlorine, bromine, unsubstituted or substituted $C_1$–$C_4$-alkyl, $C_1$–$C_4$-alkoxy, phenyl or phenoxy, and X is hydrogen, halogen, a sulphonic acid group, lower alkyl, a thioether group, an ether group, or an unsubstituted or substituted amino group, together with at least one second dyestuff selected from the group consisting of a yellow-dyeing dyestuff, red-dyeing dyestuff and navy blue- or black-dyeing dyestuff.

2. A process according to claim 1, wherein in the dyestuff of the formula (2), $T_1$ and $T_2$ each independently is Cl or $OCH_3$.

3. A process according to claim 1, wherein in the dyestuff of the formula (2) X is halogen, sulpho, $C_1$–$C_4$-alkyl or a thioether, ether or an unsubstituted or substituted amino group.

4. A process according to claim 1, wherein the dyestuff of the formula (2) is at least one dyestuff of the formula

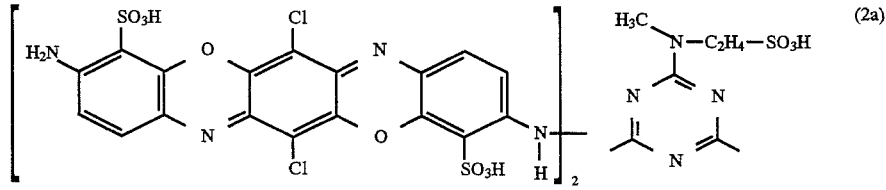 (2a)

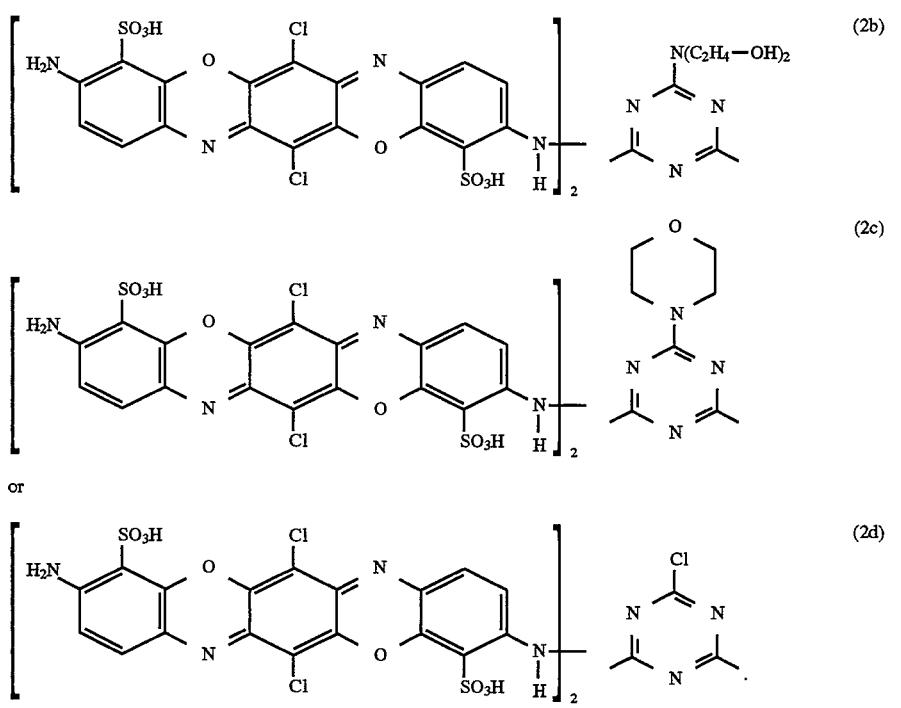

(2b)

(2c)

or

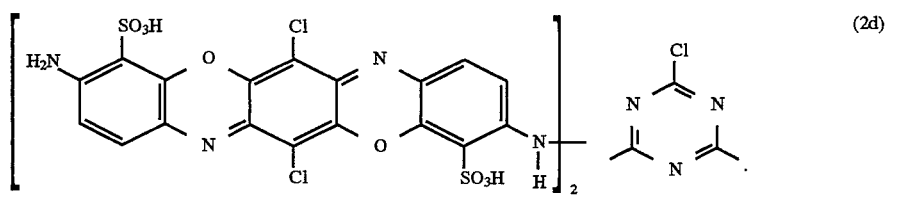

(2d)

5. A process according to claim 1, wherein the second dyestuff is at least one yellow-dyeing dyestuff of the formula (3) or (4)

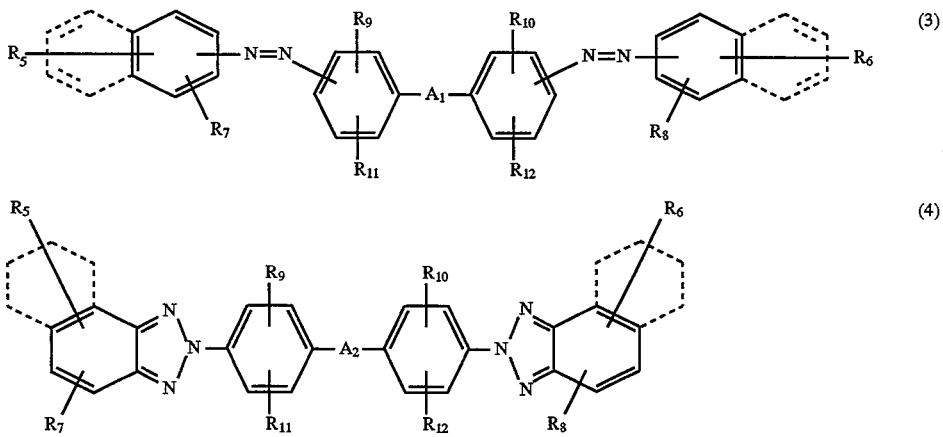

(3)

(4)

wherein $R_5$ and $R_6$ denote hydrogen, $C_1$–$C_8$-alkyl, $C_1$–$C_8$-alkoxy, halogen, carboxyl, sulpho, ureido, $C_2$–$C_6$-alkanoylamino which is unsubstituted or substituted in the alkyl part, or unsubstituted or substituted arylazo, $R_7$, $R_8$, $R_9$, $R_{10}$, $R_{11}$ and $R_{12}$ denote hydrogen, $C_1$–$C_8$-alkyl, $C_1$–$C_8$-alkoxy, halogen, carboxyl, sulpho, ureido or $C_2$–$C_6$-alkanoylamino which is unsubstituted or substituted in the alkyl part and $A_1$ is a radical of the formula $$-CH=CH- \qquad (5)$$

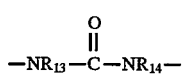 (6)

-continued

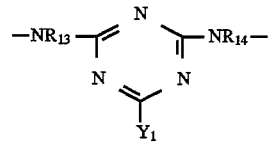 (7)

or

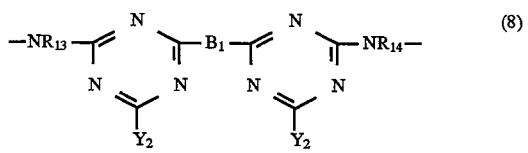 (8)

and $A_2$ is a radical of the formula

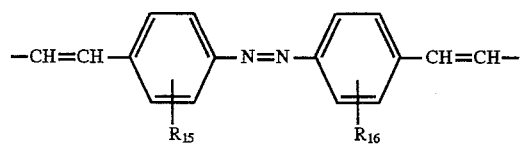 (9)

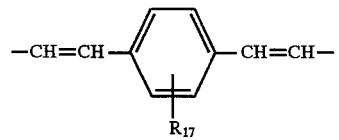 (10)

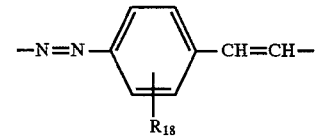 (11)

wherein $R_{13}$ and $R_{14}$ denote hydrogen or unsubstituted or substituted $C_1-C_8$-alkyl, $Y_1$ in the radical of the formula (7) and $Y_2$ in the radical of the formula (8) denote hydroxyl, $C_1-C_4$-alkoxy, chlorine, bromine, $C_1-C_4$-alkylthio, amino, N-mono- or N,N-di-$C_1-C_4$-alkylamino which is unsubstituted or substituted by hydroxyl, sulpho, carboxyl or $C_1-C_4$-alkoxy in the alkyl part, cyclohexylamino, phenylamino which is unsubstituted or substituted by $C_1-C_4$-alkyl, $C_1-C_4$-alkoxy, carboxyl, sulpho and/or halogen in the phenyl part, or N-$C_1-C_4$-alkyl-N-phenylamino, morpholino or 3-carboxy- or 3-carbamoylpyridin-1-yl, $B_1$ in the radical of the formula (8) is a bridge member and $R_{15}$, $R_{16}$, $R_{17}$ and $R_{18}$ denote hydrogen, $C_1-C_8$-alkyl, $C_1-C_8$-alkoxy, halogen, carboxyl, sulpho, ureido or $C_2-C_6$-alkanoyl-amino which is unsubstituted or substituted in the alkyl part.

6. A process according to claim 1, wherein the second dyestuff is a red-dyeing dyestuff selected from the group consisting of the following dyestuffs of the formulas (26) to (31):

N-mono- or N,N-di-$C_1-C_4$-alkylamino which is unsubstituted or substituted by hydroxyl, sulpho, carboxyl or $C_1-C_8$-alkoxy in the alkyl part, cyclohexylamino, phenylamino which is unsubstituted or substituted by at least one of $C_1-C_8$-alkyl, $C_1-C_8$-alkoxy, carboxyl, sulpho, and halogen in the phenyl part, or N-$C_1-C_4$-alkyl-N-phenylamino, morpholino or 3-carboxyl- or 3-carbamoylpyridin-1-yl,

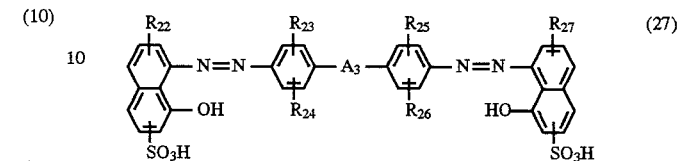 (27)

wherein $R_{22}$, $R_{23}$, $R_{24}$, $R_{25}$, $R_{26}$ and $R_{27}$ denote hydrogen, unsubstituted or substituted $C_1-C_8$-alkyl or $C_1-C_8$-alkoxy, halogen, carboxyl, sulpho, ureido or $C_2-C_6$-alkanoylamino which is unsubstituted or substituted in the alkyl part, and $A_3$ is a radical of the formula $$-NH-;$$

$$-NR-\overset{O}{\underset{\|}{C}}-NR'-$$

or

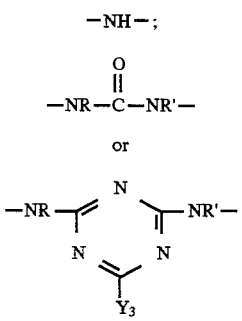

wherein R and R' denote hydrogen or unsubstituted or substituted $C_1-C_8$-alkyl and $Y_3$ denotes hydroxyl, $C_1-C_4$-alkoxy, chlorine, bromine, $C_1-C_4$-alkylthio, amino, N-mono- or N,N-di-$C_1-C_4$-alkylamino which is unsubstituted or substituted by hydroxyl, sulpho, carboxyl or $C_1-C_8$-

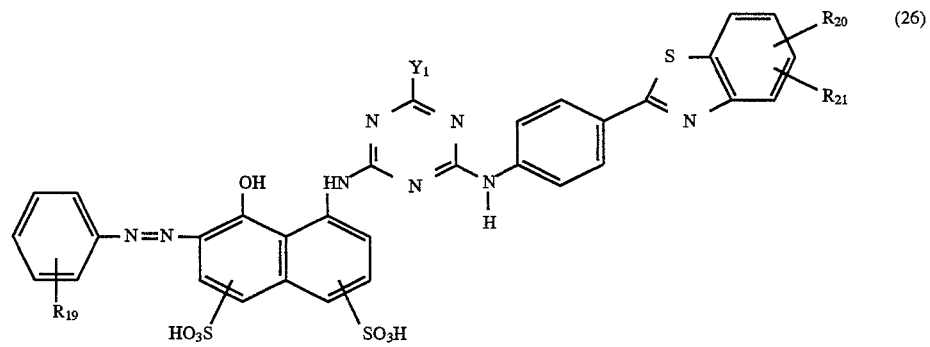 (26)

wherein $R_{19}$, $R_{20}$ and $R_{21}$ denote hydrogen, unsubstituted or substituted $C_1-C_8$-alkyl or $C_1-C_8$-alkoxy, halogen, carboxyl, sulpho, ureido or $C_2-C_6$-alkanoyl-amino which is unsubstituted or substituted in the alkyl part, $Y_1$ is hydroxyl, $C_1-C_4$-alkoxy, chlorine, bromine, $C_1-C_4$-alkylthio, amino, alkoxy in the alkyl part, cyclohexylamino, phenylamino which is unsubstituted or substituted by $C_1-C_4$-alkyl, $C_1-C_4$-alkoxy, carboxyl, sulpho and/or halogen in the phenyl part, or N-$C_1-C_4$-alkyl-N-phenylamino, morpholino or 3-carboxy- or 3-carbamoylpyridin-1-yl,

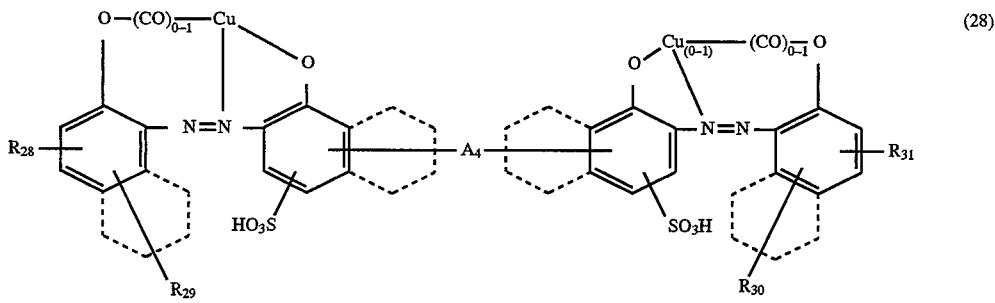

wherein $R_{28}$, $R_{29}$, $R_{30}$ and $R_{31}$ are hydrogen, unsubstituted or substituted $C_1$-$C_4$-alkyl or $C_1$-$C_8$-alkoxy, halogen, carboxyl, sulpho, ureido, sulphamoyl or $C_2$-$C_6$-alkanoylamino which is unsubstituted or substituted in the alkyl part and $A_4$ has the meanings given above for $A_3$ under formula (27),

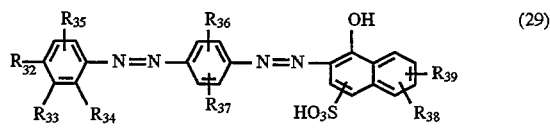

wherein $R_{32}$, $R_{33}$, $R_{34}$, $R_{35}$, $R_{36}$, $R_{37}$ and $R_{38}$ are hydrogen, unsubstituted or substituted $C_1$-$C_8$-alkyl or $C_1$-$C_8$-alkoxy, halogen, carboxyl, sulpho, ureido or $C_2$-$C_6$-alkanoylamino which is unsubstituted or substituted in the alkyl part and $R_{39}$ is benzoylamino which is unsubstituted or substituted in the phenyl ring or a radical of the formula

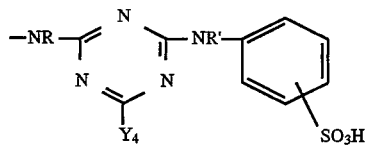

which is unsubstituted or further substituted in the phenyl ring and wherein $R_1$ and R' are hydrogen or unsubstituted or substituted $C_1$-$C_8$-alkyl and $Y_4$ has the meanings given above for $Y_3$ under formula (27),

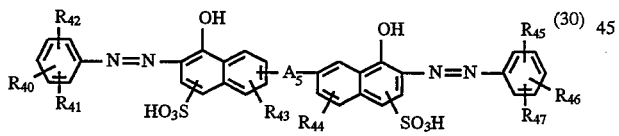

wherein $R_{40}$, $R_{41}$, $R_{42}$, $R_{43}$, $R_{44}$, $R_{45}$, $R_{46}$ and $R_{47}$ are hydrogen, unsubstituted or substituted $C_1$-$C_8$-alkyl or $C_1$-$C_8$-alkoxy, halogen, carboxyl, sulpho, ureido or $C_2$-$C_8$-alkanoylamino which is unsubstituted or substituted in the alkyl part, and wherein $R_{40}$ and $R_{46}$ can additionally denote phenylazo which is unsubstituted or substituted in the phenyl ring, and $A_5$ has the meanings given above for $A_3$ under formula (27), or is a radical of the formula

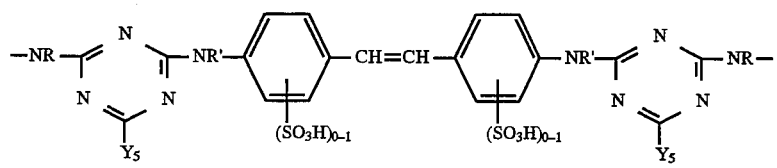

wherein $R_1$ and R' are hydrogen or unsubstituted or substituted $C_1$-$C_8$-alkyl and $Y_5$ has the meanings given above for $Y_3$ under formula (27),

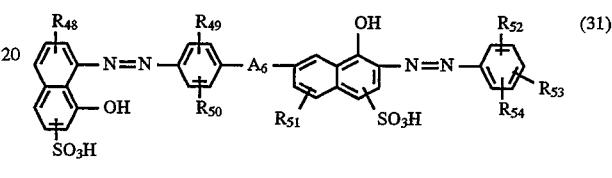

wherein $R_{48}$, $R_{49}$, $R_{50}$, $R_{51}$, $R_{52}$, $R_{53}$ and $R_{54}$ are hydrogen, unsubstituted or substituted $C_1$-$C_8$-alkyl or $C_1$-$C_8$-alkoxy, halogen, carboxyl, sulpho, ureido or $C_2$-$C_6$-alkanoylamino which is unsubstituted or substituted in the alkyl part, and wherein $R_{53}$ can additionally denote phenylazo which is unsubstituted or substituted in the phenyl ring, and $A_6$ has the meanings given above for $A_3$ under formula (27).

7. A process according to claim 1, wherein the second dyestuff is a red-dyeing dyestuff which is at least one dyestuff selected from the group consisting of dyestuffs of the formulas (32) to (44)

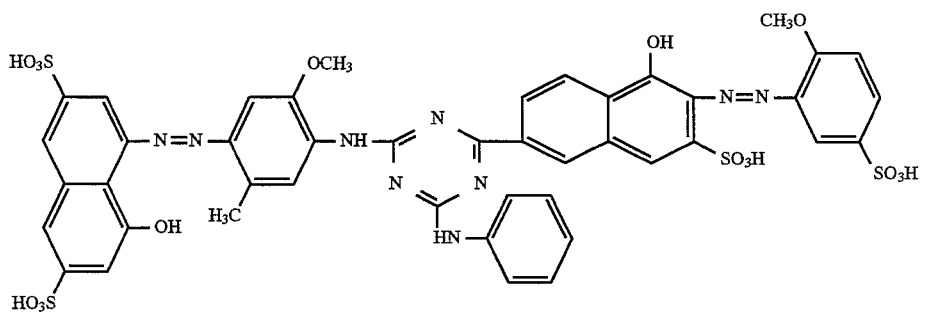 (32)
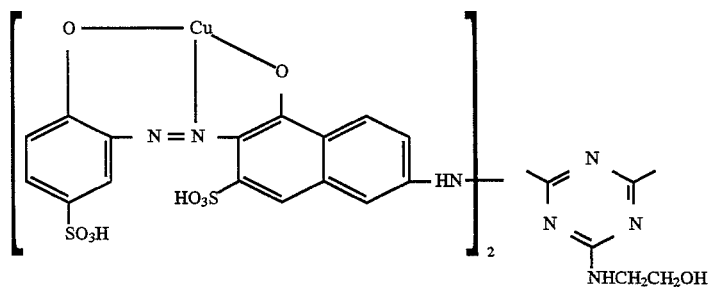 (33)
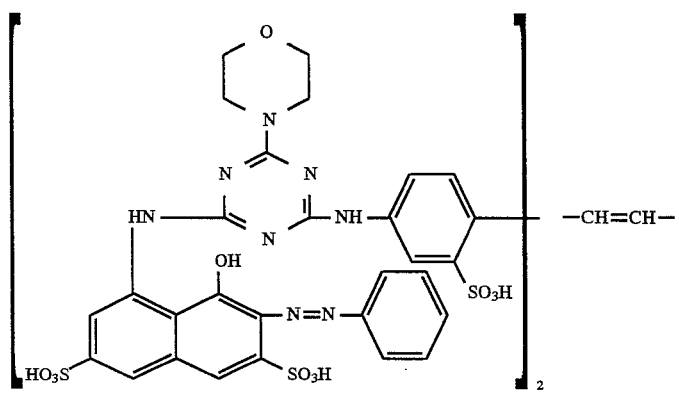 (34)
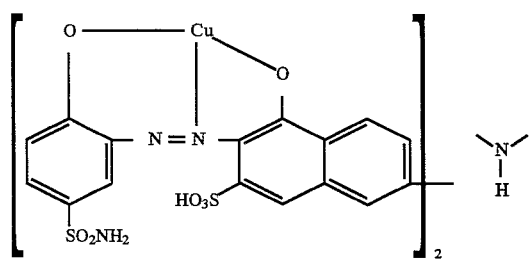 (35)
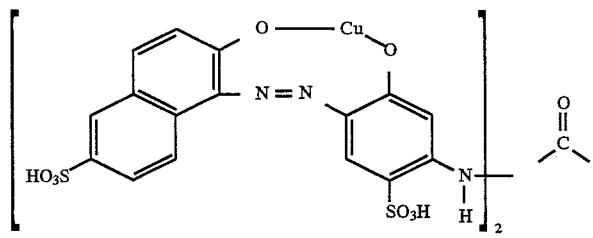 (36)

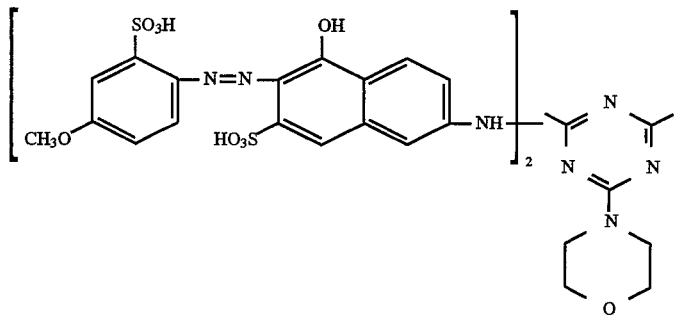
(37)
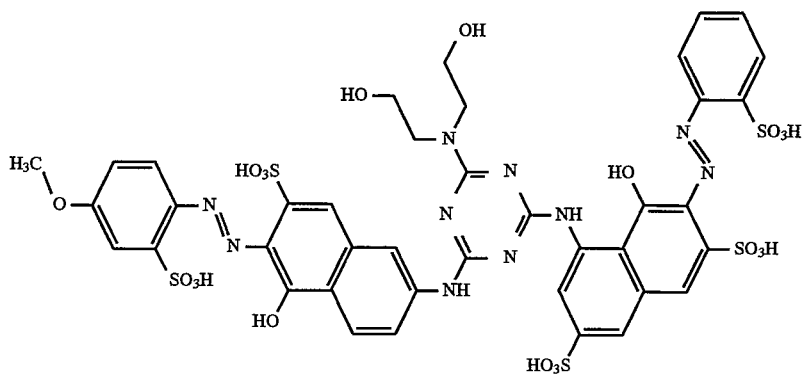
(38)
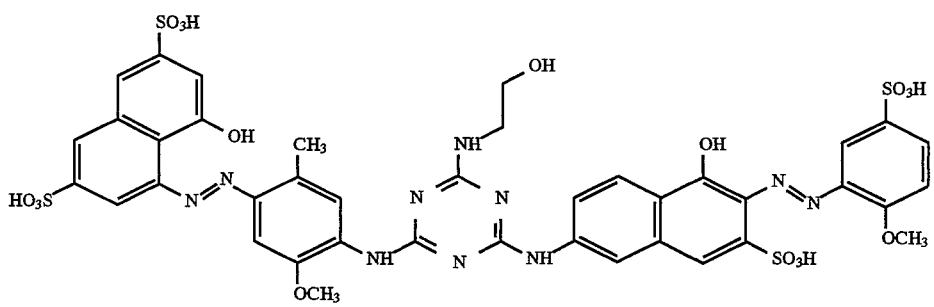
(39)
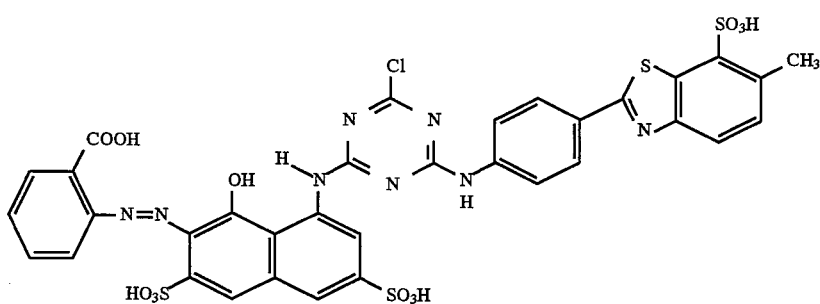
(40)
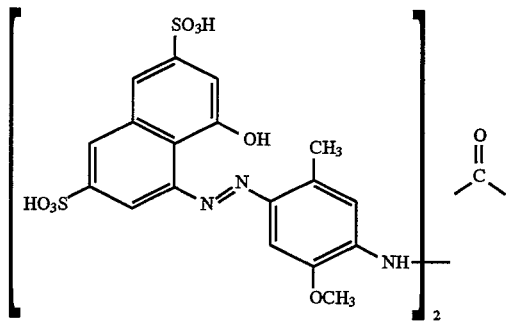
(41)

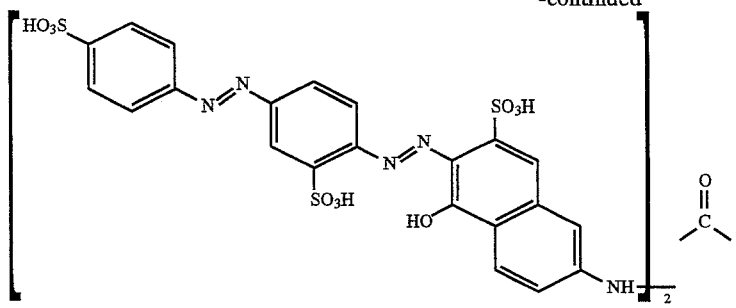

(42)

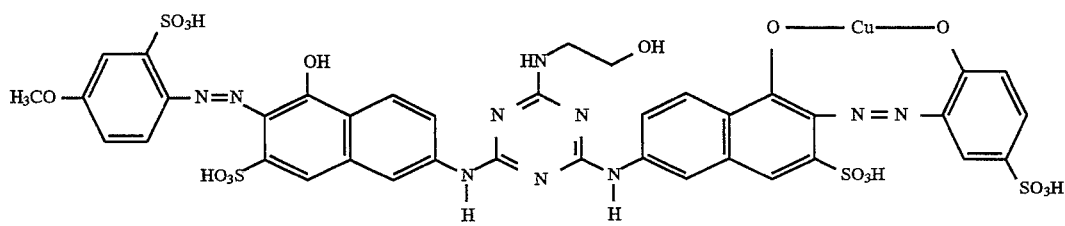

(43)

and

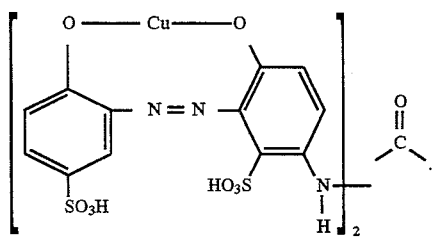

(44)

8. A process according to claim 1, wherein the second dyestuff is a navy blue-or black-dyeing dyestuff which is at least one dyestuff selected from the group consisting of dyestuffs of the formulas (45) to (48)

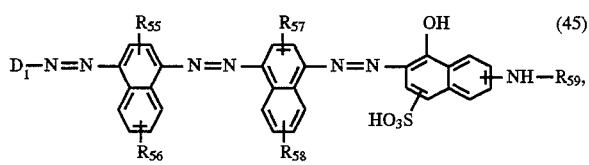

(45)

wherein $D_1$ denotes unsubstituted or substituted phenyl or naphthyl, $R_{55}$, $R_{56}$, $R_{57}$ and $R_{58}$ denote hydrogen, optionally substituted $C_1$-$C_8$-alkyl or $C_1$-$C_8$-alkoxy, halogen, carboxyl, sulpho, ureido or $C_2$-$C_6$-alkanoylamino which is unsubstituted or substituted in the alkyl part and $R_{59}$ denotes hydrogen, unsubstituted or substituted $C_1$-$C_8$-alkyl, $C_2$-$C_6$-alkanoyl which is unsubstituted or substituted in the alkyl part or phenyl or benzoyl which is unsubstituted or substituted in the phenyl ring,

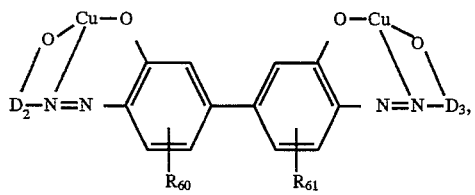

(46)

wherein $D_2$ and $D_3$ denote unsubstituted or substituted naphthyl and $R_{60}$ and $R_{61}$ denote hydrogen, unsubstituted or substituted $C_1$-$C_8$-alkyl or $C_1$-$C_8$-alkoxy, halogen, carboxyl, sulpho, ureido or $C_2$-$C_6$-alkanoyl-amino which is unsubstituted or substituted in the alkyl part,

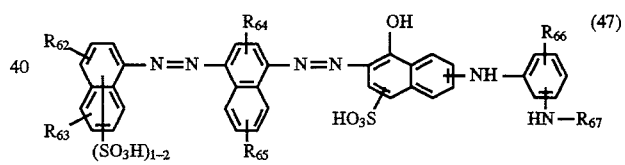

(47)

wherein $R_{62}$, $R_{63}$, $R_{64}$, $R_{65}$ and $R_{66}$ denote hydrogen, unsubstituted or substituted alkyl or $C_1$-$C_8$-alkoxy, or $C_1$-$C_8$ halogen, carboxyl, sulpho, ureido or $C_2$-$C_6$-alkanoylamino which is optionally substituted in the alkyl part and $R_{67}$ denotes hydrogen, unsubstituted or substituted $C_1$-$C_8$-alkyl, unsubstituted or substituted $C_2$-$C_6$-alkanoyl or phenyl or benzoyl which is unsubstituted or substituted in the phenyl ring,

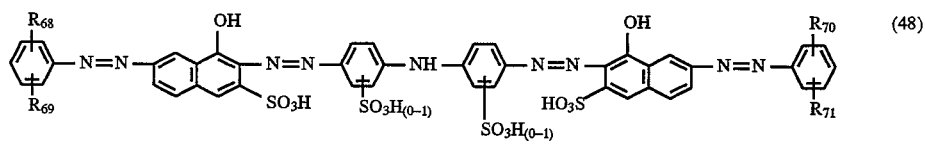

wherein $R_{68}$, $R_{69}$, $R_{70}$ and $R_{71}$ denote hydrogen, unsubstituted or substituted $C_1$–$C_8$-alkyl or $C_1$–$C_8$-alkoxy, halogen, carboxyl, sulpho, ureido or $C_2$–$C_6$-alkanoyl-amino which is unsubstituted or substituted in the alkyl part.

9. A process according to claim 1, wherein the second dyestuff is a navy blue-or black-dyeing dyestuff which is at least one dyestuff selected from the group consisting of dyestuffs of the formulas (49) to (56)

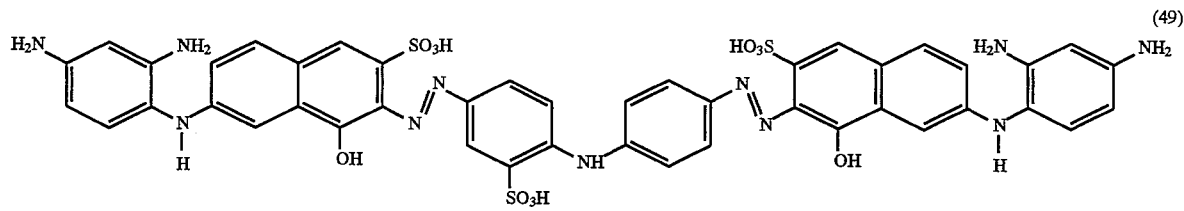

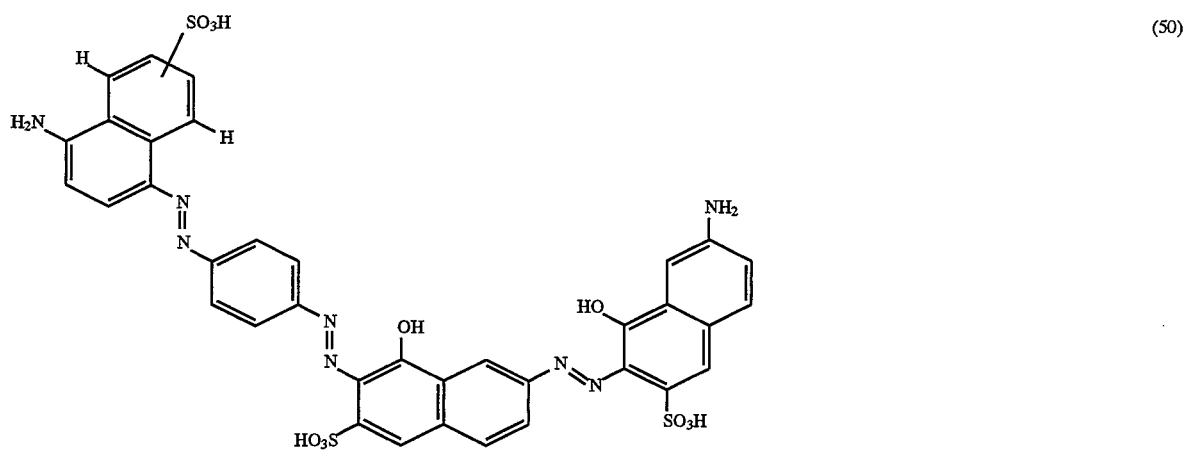

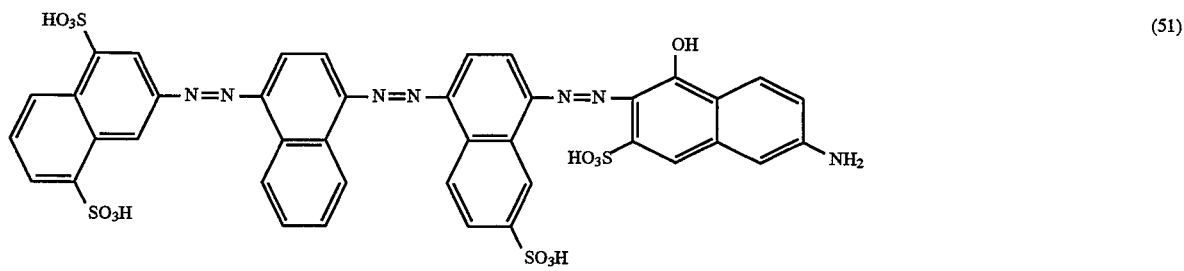

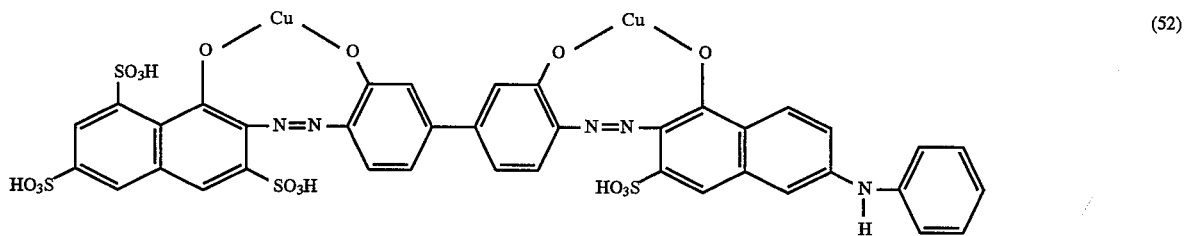

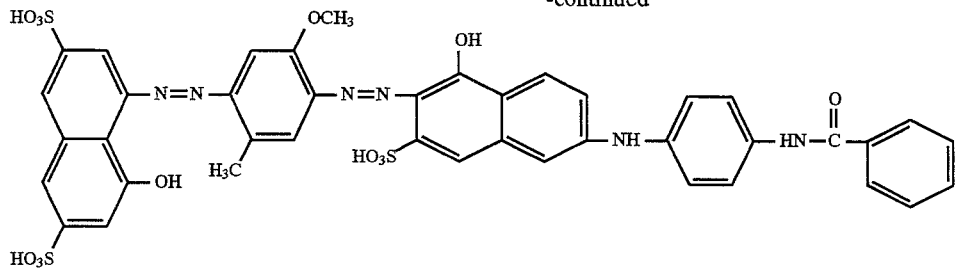

(53)

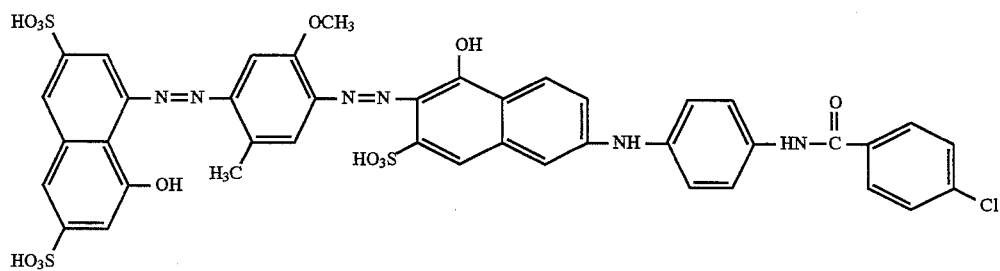

(54)

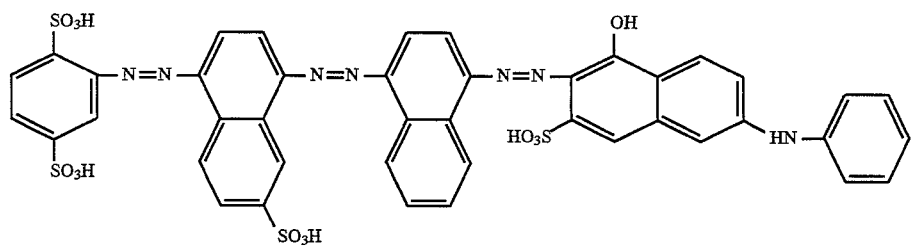

(55)

and

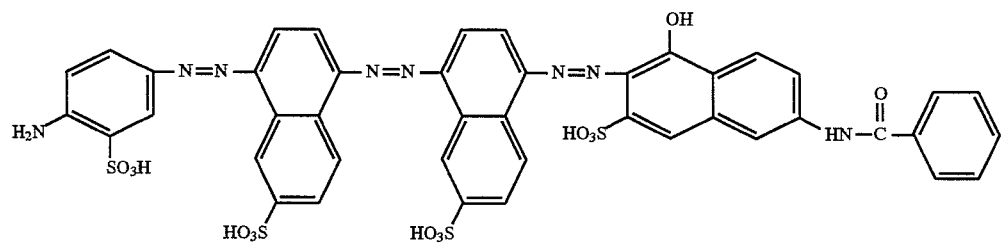

(56)

10. A process according to claim 1, wherein dyeing is carried out in the presence of a salt.

11. A process according to claim 1, wherein the material comprises a fiber mixture of synthetic fibers and cellulosic, fibers, the dyestuff mixture in addition to the first and second dyestuffs containing a disperse dyestuff for the synthetic fibers.

12. A process according to claim 18, wherein the fiber material being dyed is a polyester/cotton blended fabric, dyeing being effected in a one-stage one-bath process, in an aqueous liquor at a temperature from about 100° to 150° C. at a pH from about 4 to 7.5, the dyestuff mixture in addition to the first and second dyestuffs containing a disperse dyestuff for the polyester.

13. A process according to claim 1, wherein the second dyestuff is a yellow-dyeing dyestuff selected from the group consisting of (16) to (25)

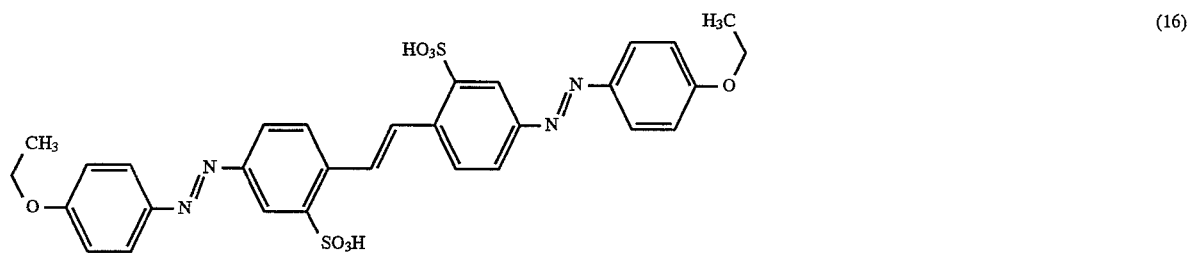

(16)

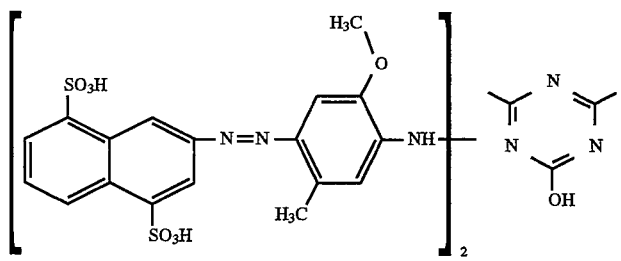
(17)
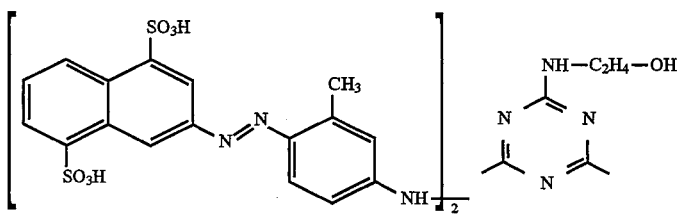
(18)
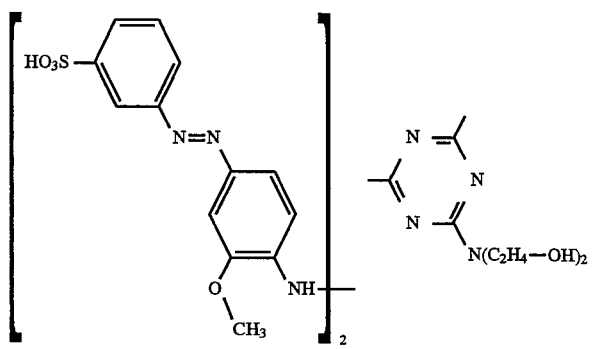
(19)
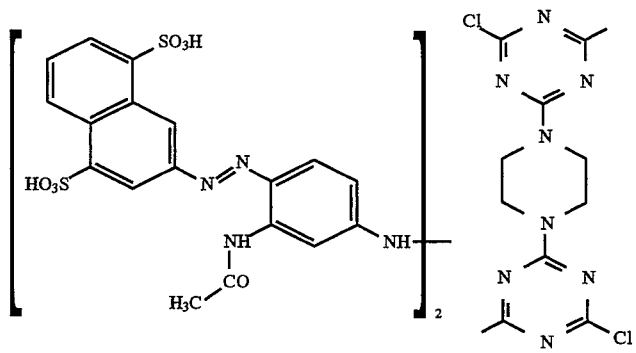
(20)
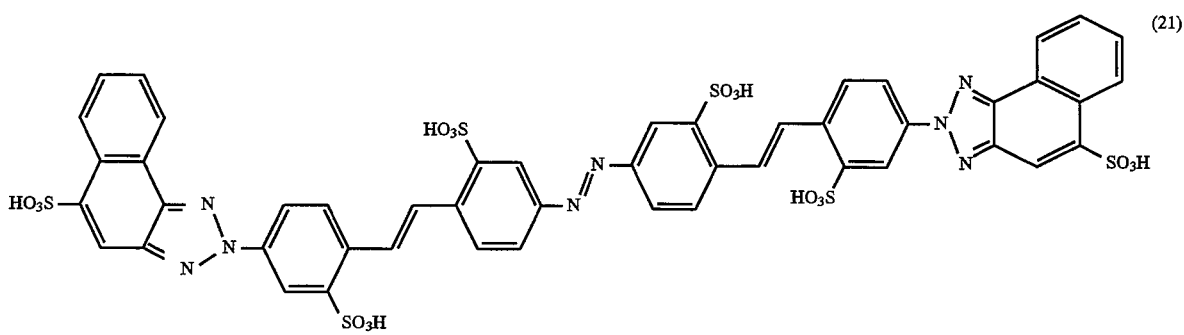
(21)

-continued
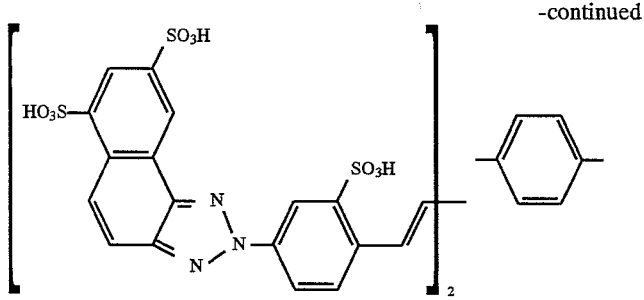 (22)
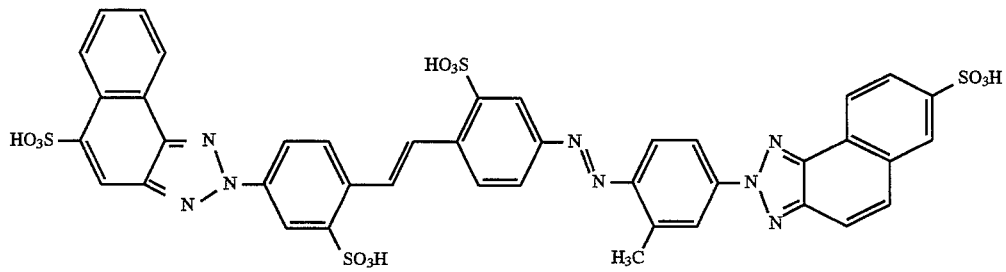 (23)
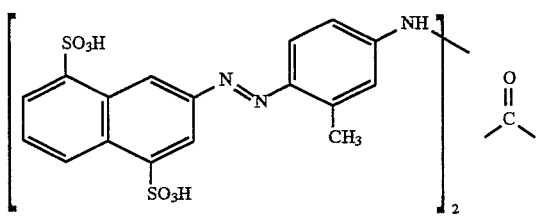 (24)
and
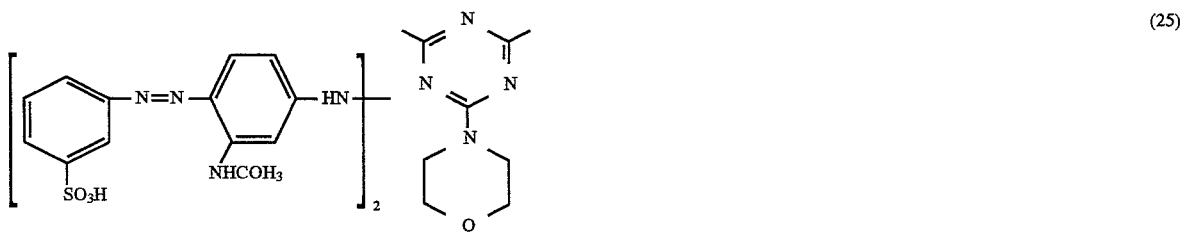 (25)
14. A process according to claim 1, wherein the first dyestuff is
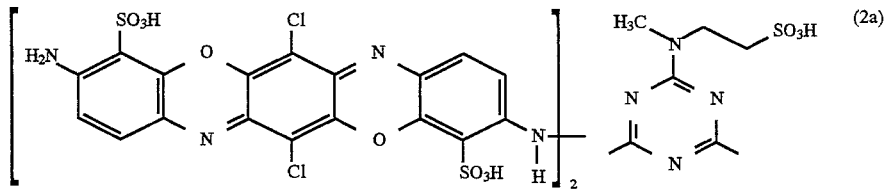 (2a)

and the second dyestuff is
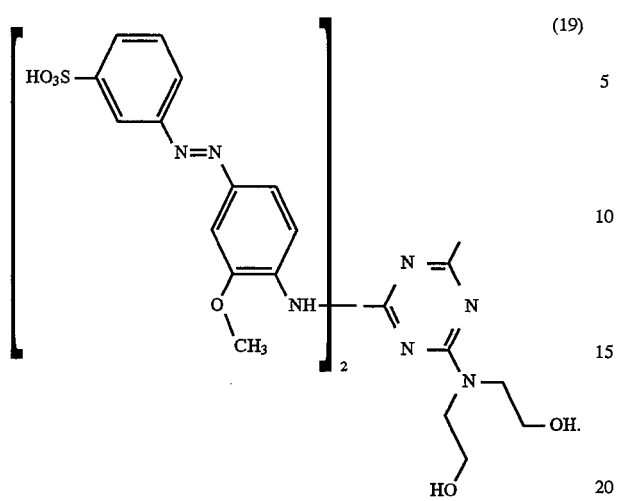
(19)

UNITED STATES PATENT AND TRADEMARK OFFICE
CERTIFICATE OF CORRECTION

PATENT NO. : 5,653,773
DATED : August 5, 1997
INVENTOR(S) : Reddig, et al.

It is certified that error appears in the above-indentified patent and that said Letters Patent is hereby corrected as shown below:

Col. 38, lines 2-3  Delete " $C_1-C_8$-alkoxy " and substitute -- $C_1-C_4$-alkoxy --

Col. 38, lines 38 & 54  Delete " $C_1-C_8$-alkoxy " and substitute -- $C_1-C_4$-alkoxy --

Col. 39, line 52-53  Delete " $C_2-C_8$-alkanoylamino " and substitute -- $C_2-C_6$-alkanoylamino --

Col. 46, lines 48-49  After " substituted " insert -- $C_1-C_8$- and after " $C_1-C_8$-alkoxy " delete "or $C_1-C_8$ "

Col. 49, line 51  Delete claim " 18 " and substitute -- 1 --

Signed and Sealed this

Seventeenth Day of March, 1998

Attest:

BRUCE LEHMAN

Attesting Officer

Commissioner of Patents and Trademarks